US005543934A

United States Patent [19]
Takeuchi et al.

[11] Patent Number: 5,543,934
[45] Date of Patent: Aug. 6, 1996

[54] APPARATUS AND METHOD FOR RESPECTIVELY RECORDING DIGITAL VIDEO AND AUDIO SIGNALS IN BOTH ENDS PORTIONS AND MIDDLE PORTION OF EACH INCLINED TRACK OF MAGNETIC TAPE

[75] Inventors: Koso Takeuchi, Osaka; Kunio Suesada, Ikoma, both of Japan

[73] Assignee: Matsushita Electric Industrial Co., Ltd., Osaka, Japan

[21] Appl. No.: 231,846

[22] Filed: Apr. 25, 1994

[30] Foreign Application Priority Data

Apr. 26, 1993 [JP] Japan .................................. 5-099114

[51] Int. Cl.$^6$ .................................................. H04N 5/7826
[52] U.S. Cl. .......................... 358/341; 358/343; 360/19.1
[58] Field of Search .................................... 358/341, 343; 360/19.1; H04N 7/7826

[56] References Cited

U.S. PATENT DOCUMENTS

| | | | |
|---|---|---|---|
| 4,855,843 | 8/1989 | Ive ............................................ | 360/10.2 |
| 4,914,527 | 4/1990 | Asai .......................................... | 358/343 |
| 5,150,262 | 9/1992 | Hosokawa et al. ....................... | 360/48 |
| 5,287,196 | 2/1994 | Yamashita ................................. | 358/341 |
| 5,386,323 | 1/1995 | Ishiwata ................................... | 360/19.1 |

FOREIGN PATENT DOCUMENTS

| | | |
|---|---|---|
| 0241014 | 10/1987 | European Pat. Off. . |
| 2059135 | 4/1981 | United Kingdom . |

OTHER PUBLICATIONS

T. Eguchi, "The SMPTE D-1 Format and Possible Scanner Configurations", SMPTE Journal, Feb. 1987, pp. 166–170.

J. H. Wilkinson, "A Review of the Signal Format Specification for the 4:2:2 Component Digital VTR", SMPTE Journal, Dec. 1987, pp. 1166–1172.

Proposed SMPTE Standard for Television Digital Component Recording—19–mm Type D–1—, Helical Data and Control Records, SMPTE Journal, pp. 203–221, Mar. 1992.

Primary Examiner—Howard W. Britton
Attorney, Agent, or Firm—Willian Brinks Hofer Gilson & Lione

[57] ABSTRACT

In an apparatus and method for recording inputted digital video and audio signals of one field, which are synchronous with each other, onto a plurality of inclined tracks of a magnetic tape using a plurality sets of helical scan type magnetic heads provided in a rotation head drum at predetermined angle intervals, a read clock is generated. A read address of a first field memory is generated based on the read clock, so that the inputted digital video signal is read out and recorded onto both end portions of each of the inclined tracks of the magnetic tape, after starting recording the inputted digital video signal of one field onto an end of the inclined track, and ending recording the inputted digital video signal of one field onto another end of the other inclined track. On the other hand, a read address of a second field memory is generated based on the read clock, so that the inputted digital audio signal is read out and recorded onto the middle portion of each of the inclined tracks.

6 Claims, 19 Drawing Sheets

APPARATUS AND METHOD FOR RESPECTIVELY RECORDING DIGITAL VIDEO AND AUDIO SIGNALS IN BOTH ENDS PORTIONS AND MIDDLE PORTION OF EACH INCLINED TRACK OF MAGNETIC TAPE

BACKGROUND OF THE INVENTION

1. Field of the Invention

The present invention relates to an apparatus and a method for respectively recording digital video and audio signals, and in particular, to an apparatus and a method for respectively recording digital video and audio signals in both end portions and a middle portion of each inclined track of a magnetic tape, such as a helical scan head type digital video tape recorder (referred to as a "digital VTR" hereinafter).

2. Description of the Related Art

FIG. 8 is a timing chart of a signal processing in recording and reproducing a digital audio signal by a conventional D-1 type digital VTR which a ½ inch digital VTR for use in broadcasting made based on a standard of the SMPTE (Society of Motion Picture and Television Engineers). In FIG. 8, c represents the input video signal, a1 represents the input time interval of the recording audio signal, a2 represents the recording processing time interval of the digital audio signal, a3–a6 represent the recording time interval of the digital audio signal, b1–b4 represent the reproducing time interval of the digital audio signal, b5 represents the reproducing processing time interval of the digital audio signal, b6 represents the output time interval of the reproducing audio signal, e represents one segment, each f represents one field, and t represents increasing time.

When it is tried as an editing process to execute a cross-fade editing process wherein first video and audio signals are faded in and second video and audio signals are faded out crossing fading-in and fading-out operations, by means of the conventional D-1 type digital VTR with reproducing magnetic heads which are put in advance of recording magnetic heads by 8.5 segments, as shown by d in FIG. 8, any time interval required for the digital audio signal reproducing process cannot be established as shown in b4 of FIG. 8, and therefore the cross-fade editing cannot be executed.

FIG. 14 shows a tape format showing a method of recording digital video and audio signals which is used in the conventional D-1 type digital VTR.

Referring to FIG. 14, reference numeral 100 denotes a recording magnetic tape having a width of ½ inch. A cue audio track 101 is formed in the top part of the magnetic tape 100, while a control track 102 and a time code track 103 are formed in the bottom part of the magnetic tape 100. In FIG. 14, a tape running direction 104 and a corresponding head rotation direction 105 are shown.

A digital audio signal 106 is recorded in the middle portion, between two video sectors 107 of each inclined track in the D-1 type digital VTR. In this case, since the boundaries each between respective adjacent fields are placed in the middle portion of each inclined track, namely, the start point and the end point of each field interval is placed in the middle portion of each inclined track, in order to execute, for example, a double speed playback which is defined as a playback operation for reproducing signals recorded in the fields or frames with skipping one field or one frame, it is required to instantaneously move a set of automatic tracking movable magnetic heads (referred to as AT magnetic heads hereinafter) from the end point of the field, which is currently subjected to reproduction located at the middle portion of the inclined track, into the start point of the next reproduction field located at the middle portion of the inclined track separated apart from the current field by a plurality of tracks. In this case, it is extremely difficult to control the AT magnetic heads, and therefore, a measure of providing an increased number of reproducing magnetic heads, or the like must be taken in order to cope with the above-mentioned problems.

Further, FIG. 2 shows a tape format which is used in a conventional D-3 type digital VTR which is a ½ inch digital VTR for use in broadcasting made based on a standard of the above-mentioned SMPTE.

In the conventional D-3 type VTR, the digital video and audio signals of one field interval are divided into three segments according to the NTSC 108 system or are divided into four segments according to the PAL 109 system, and then they are recorded sequentially on a magnetic tape having a width of ½ inch by a pair of magnetic heads with formation of inclined tracks on the magnetic tape 100. In this case, the recording areas of the digital audio signal are located at both ends of each inclined track in the inclined width direction as shown in FIG. 2. The audio channels 1 through 4, which is respectively shown by A1 through A4 in FIG. 2, are recorded dividedly in each field. The recording areas of the digital video and audio signals are segmented in the unit of a field so that the boundaries each between the respective adjacent segments or the respective adjacent fields coincide with the ends of each inclined track.

FIG. 3 shows a timing chart of signal processing in recording and reproducing a digital audio signal which is executed in the conventional D-3 type digital VTR according to PAL system. In FIG. 3, c represents the input video signal, a1 represents the input time interval of the recording audio signal, a2 represents the recording processing time interval of the digital audio signal, a3–a6 represent the recording time interval of the digital audio signal, b1–b4 represent the reproducing time interval of the digital audio signal, b5 represents the reproducing processing time interval of the digital audio signal, b6 represents the output time interval of the reproducing audio signal, e represents one segment, each f represents one field, and t represents increasing time.

Referring to FIG. 3, an inputted audio or speech signal of one field f interval is stored in advance of the top end of the video signal of one field interval by 128 samples as shown by a1 and h of FIG. 3. Taking advantage of the advance in time of the audio signal with respect to the video signal, digital audio signal recording processes including a shuffling process, an error correction code generating process and the like are executed every field as shown in a2 of FIG. 3. The audio signal is further divided into four segments as shown in a3 through a6 of FIG. 3, and then is recorded in both end portions of the inclined tracks.

In the reproducing stage, data of the four-channel digital audio signal of one field are inputted and stored in a field memory, and then digital audio signal recording processes including an error correction process, a deshuffling process and the like are executed and further outputting the resulting signal.

However, in executing a cross-fade editing process as an audio editing process by the conventional D-3 type digital VTR, it is required to output a reproduction audio signal in accordance with the same timing as the input timing for reproducing as shown in b6 of FIG. 3, so that the digital audio signal reproduced in a manner as shown in FIG. 3 can be recorded in the same position on the magnetic tape 100. For the above-mentioned reasons, the reproducing magnetic heads must be put in advance of the recording magnetic heads by 9.5 segments as shown by g in FIG. 3, with e representing one segment. Therefore, when achieving simultaneous reproduction and advanced reproduction by moving a set of movable magnetic heads, i.e., a set of so-called AT magnetic heads, it has been disadvantageously required to increase the quantity of movement of the AT magnetic heads.

SUMMARY OF THE INVENTION

In order to solve the above-mentioned problems, an essential object of the present invention is to an apparatus and method for recording digital video and audio signals in a magnetic tape, capable of easily performing a cross-fade editing process.

Another object of the present invention is to provide an apparatus and method for recording digital video and audio signals in a magnetic tape, capable of controlling the AT magnetic heads while reducing the quantity of the movement of the AT magnetic heads in the cross-fade process without increasing the number of reproducing magnetic heads.

According to one aspect of the present invention, there is provided an apparatus for recording inputted digital video and audio signals of one field, which are synchronous with each other, onto a plurality of inclined tracks of a magnetic tape using a plurality sets of helical scan type magnetic heads provided in a rotation head drum at predetermined angle intervals, comprising:

first storage means for temporarily and sequentially storing said inputted digital video signal therein;

second storage means for temporarily and sequentially storing said inputted digital audio signal therein;

read clock generating means for generating a read clock;

first read address generating means for generating a read address of said first storage means based on said read clock generated by said read clock generating means, so that said inputted digital video signal is read out and recorded through said magnetic heads onto both end portions of each of said inclined tracks of said magnetic tape, after starting recording said inputted digital video signal of one field onto an end of said inclined track, and ending recording said inputted digital video signal of one field onto another end of the other inclined track;

second read address generating means for generating a read address of said second storage means based on said read clock generated by said read clock generating means, so that said inputted digital audio signal is read out and recorded through said magnetic heads onto the middle portion of each of said inclined tracks of said magnetic tape; and recording means for combining said digital video signal and said digital audio signal respectively read out from said first and second storage means and for recording onto said magnetic tape.

In the above-mentioned apparatus, said inputted digital audio signal are preferably divided into a plurality of channels, and the middle portion of each of said inclined tracks where said inputted digital audio signal is to be recorded are preferably divided into said plurality of channels, and wherein said second read address generating means preferably generates said read address of said second storage means, so that said inputted digital audio signal is read out and recorded through said magnetic heads onto said channels of the middle portion of each of said inclined tracks of said magnetic tape, so as to be distributed in different orders of channels in respective inclined tracks.

In the above-mentioned apparatus, said second storage means comprises a plurality of sections corresponding to said plurality of channels.

In the above-mentioned apparatus, said read address of said second storage means preferably includes a segment address, a channel address, and data-in-channel read address, and wherein said second address generating means preferably comprises:

data-in-channel read address generating counter for generating said data-in-channel read address by counting said read address clock generated by said read clock generating means;

segment address generating counter for generating said segment address based on a carry signal outputted from said data-in-channel read address generating counter by counting said read clock generated by said read clock generating means; and channel address generating counter for generating said channel address based on a carry signal outputted from said channel address generating counter by counting said read clock generated by said read clock generating means.

According to another aspect of the present invention, there is provided a method for recording inputted digital video and audio signals of one field, which are synchronous with each other, onto a plurality of inclined tracks of a magnetic tape using a plurality sets of helical scan type magnetic heads provided in a rotation head drum at predetermined angle intervals, including the following steps of:

generating a read clock;

generating a read address of first storage means based on said read clock, so that said inputted digital video signal is read out and recorded through said magnetic heads onto both end portions of each of said inclined tracks of said magnetic tape, after starting recording said inputted digital video signal of one field onto an end of said inclined track, and ending recording said inputted digital video signal of one field onto another end of the other inclined track;

generating a read address of second storage means based on said read clock, so that said inputted digital audio signal is read out and recorded through said magnetic heads onto the middle portion of each of said inclined tracks of said magnetic tape; and combining said digital video signal and said digital audio signal respectively read out from said first and second storage means and recording onto said magnetic tape.

In the above-mentioned method, said inputted digital audio signal are preferably divided into a plurality of channels, and the middle portion of each of said inclined tracks where said inputted digital audio signal is to be recorded are preferably divided into said plurality of channels, and wherein said read address of said second storage means is generated, preferably, so that said inputted digital audio signal is read out and recorded through said magnetic heads onto said channels of the middle portion of each of said inclined tracks of said magnetic tape, so as to be distributed in different orders of channels in respective inclined tracks.

According to the apparatus and method for recording digital video and audio signals of the present invention, the timing of recording digital video and audio signals can be controlled in a manner that the recording areas of the digital video and audio signals are segmented in a unit of field so that each boundary between the adjacent segments coincide with the ends of each inclined track, and the recording area of the digital audio signal is placed in the middle portion of each inclined track.

With the above-mentioned arrangement, the present invention is capable of reducing the quantity of movement of the AT magnetic heads in executing a cross-fade editing process as an editing process by means of the helical scan type digital VTR.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE PREFERRED EMBODIMENT

The following describes a helical scan head type digital VTR in accordance with a preferred embodiment of the present invention with reference to the attached drawings.

Figure 1:
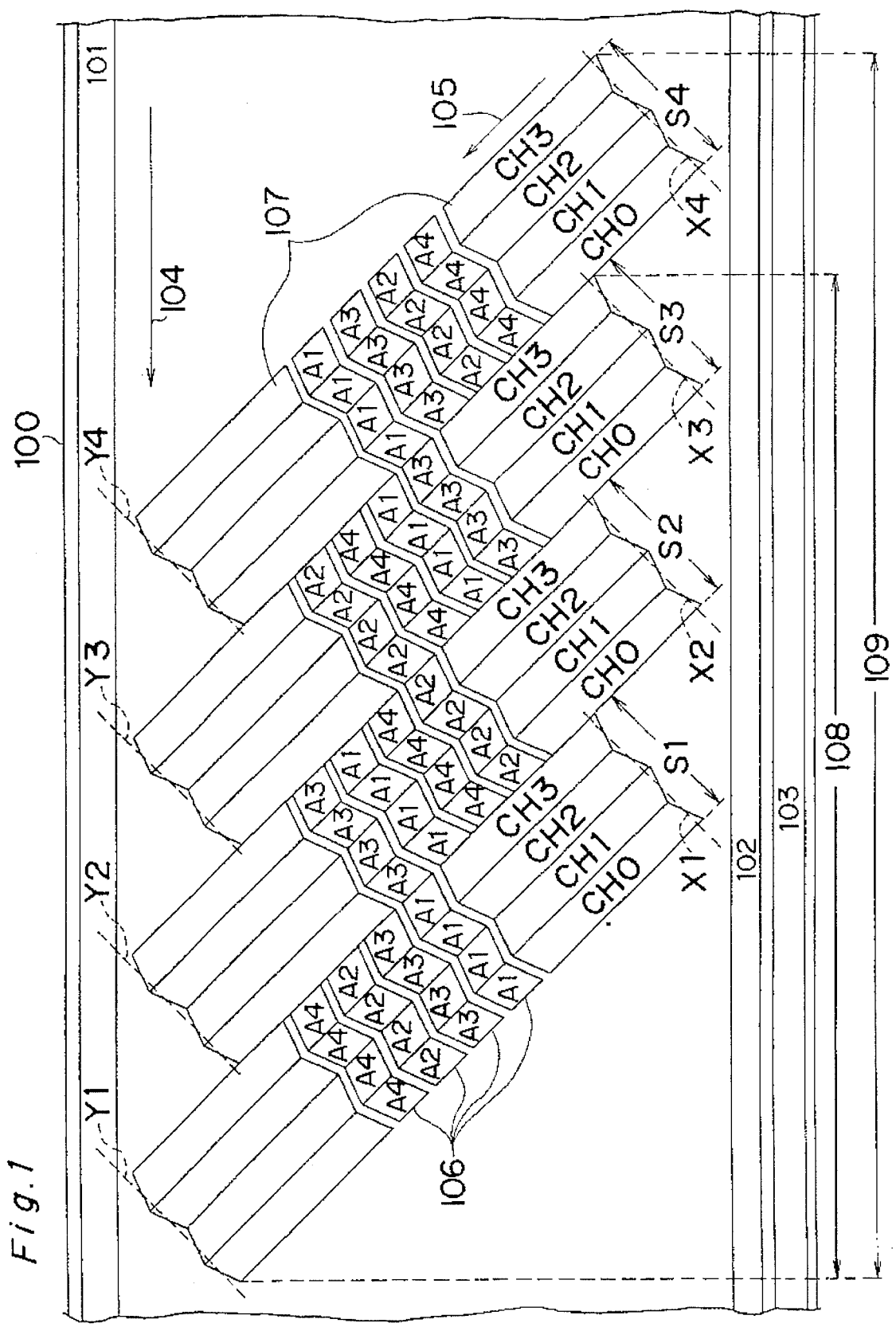
FIG. 1 is a schematic front view of a tape format showing a method of recording digital video and audio signals which is used in a digital VTR in accordance with a preferred embodiment of the present invention.
Figure 2:
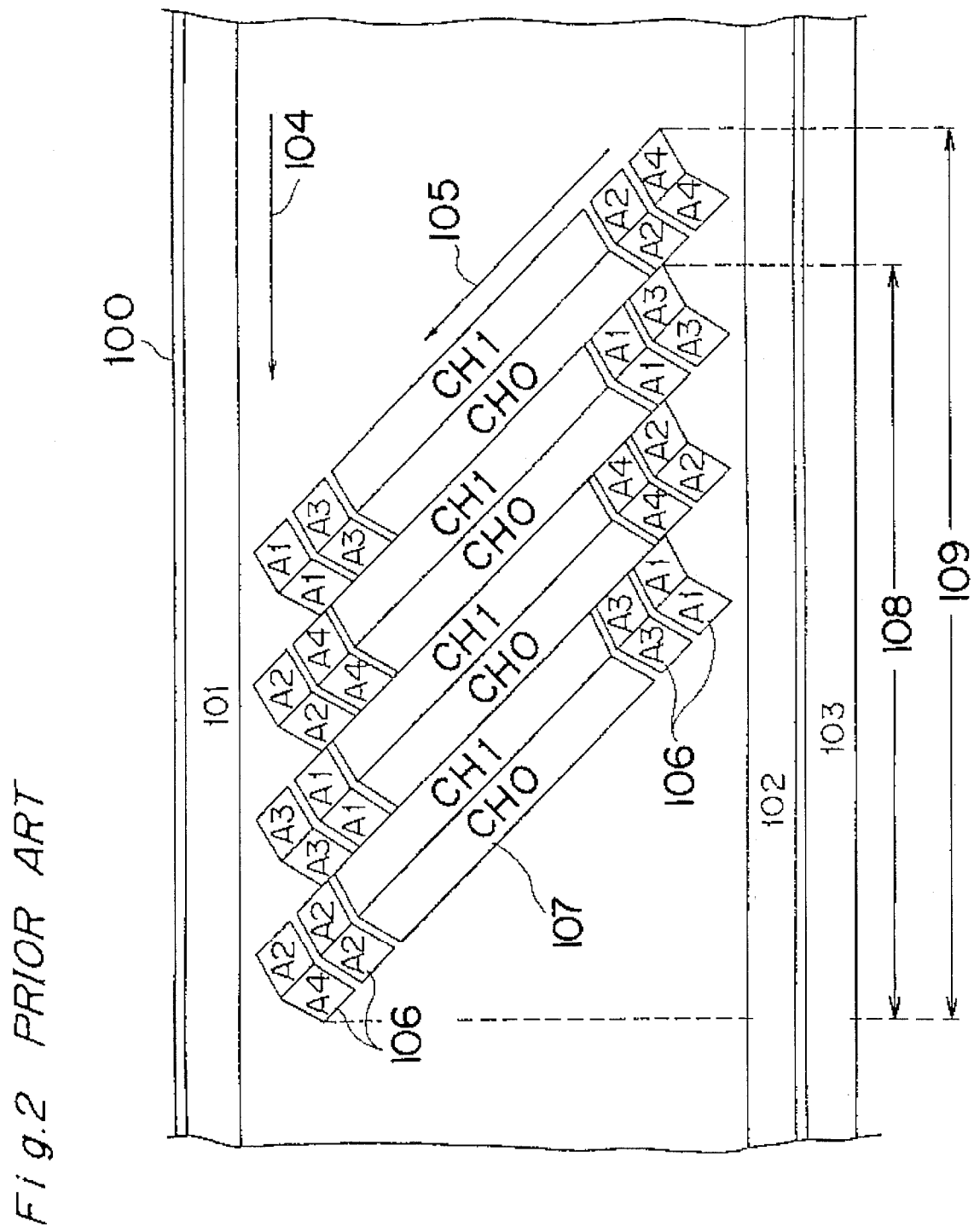
FIG. 2 is a schematic front view of a tape format showing a method of recording digital video and audio signals which is used in a conventional D-3 type digital VTR.
Figure 3:
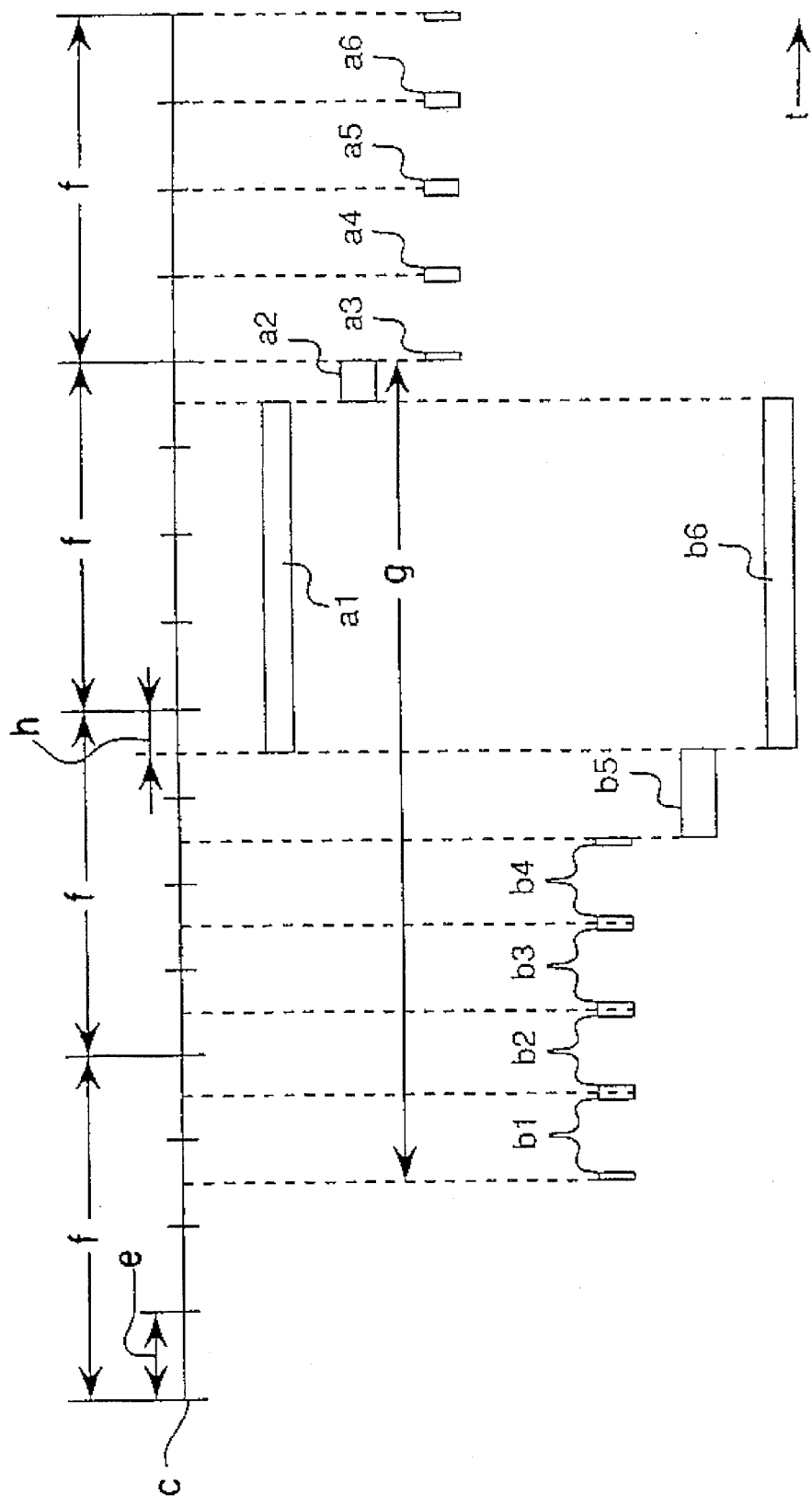
FIG. 3 is a timing chart of a signal processing for recording and reproducing a digital audio signal by the conventional D-3 type digital VTR.

FIG. 1 is a schematic front view of a tape format which is used in the digital VTR of the present preferred embodiment.

A video signal to be recorded by the digital VTR is a component signal and is a composite signal composed of a luminance signal and a chromatic signal. In FIG. 1, there are concurrently shown not only a tape format of a 525-scanning-line mode 108 conforming to the NTSC system but also a tape format of a 625-scanning-line mode 109 conforming to the PAL system. According to the 525-scanning-line mode 108, one field is divided into three segments S1 through S3, while according to the 625-scanning-line mode 109, one field is divided into four segments S1 through S4. Each segment is composed of four channels CH0 through CH3. The Cue Audio Track is indicated by 101, 102 represents the Control Track, 103 represents the Time Code Track, 104 indicates the tape running direction, and 105 indicates the head rotation direction. Regarding the recording sector of each channel, there are arranged the followings:

(a) one video sector 107;

(b) four audio sectors 109; and (c) one video sector, in an order sequentially from the lower end X1 to the upper end Y1, from the lower end X2 to the upper end Y2, from the lower end X3 to the upper end Y3, and from the lower end X4 to the upper end Y4 on the magnetic tape 100. In other words, the four audio area or sectors are arranged in the middle portion of each segment, namely, in the middle portion of each inclined track, as interposed between the video sectors.

As is obvious from the above description, (a) the segment S1 is composed of four channels extending from the lower end X1 to the upper end Y1;

(b) the segment S2 is composed of four channels extending from the lower end X2 to the upper end Y2;

(c) the segment S3 is composed of four channels extending from the lower end X3 to the upper end Y3; and (d) the segment S4 is composed of four channels extending from the lower end X4 to the upper end Y4.

Therefore, one field in the 525-scanning-line mode 108 of the NTSC system is composed of the three segments S1 through S3 extending from the lower end X1 to the upper end Y3 of inclined tracks, while one field in the 625-scanning-line mode 109 of the PAL system is composed of the four segments S1 through S4 extending from the lower end X1 to the upper end Y4 of inclined tracks. The following description will be made based on the 625-scanning-line mode.

As shown in FIG. 1, inputted analog video and audio signals are converted into digital video and audio signals, respectively, in every field interval of the video signal, and then the digital video and audio signals are divided into four segments. The digital video signal and the digital audio signal divided in the above-mentioned manner are successively and sequentially recorded with formation of inclined tracks on the magnetic tape 100 by means of two sets of recording magnetic heads.

Figure 4:
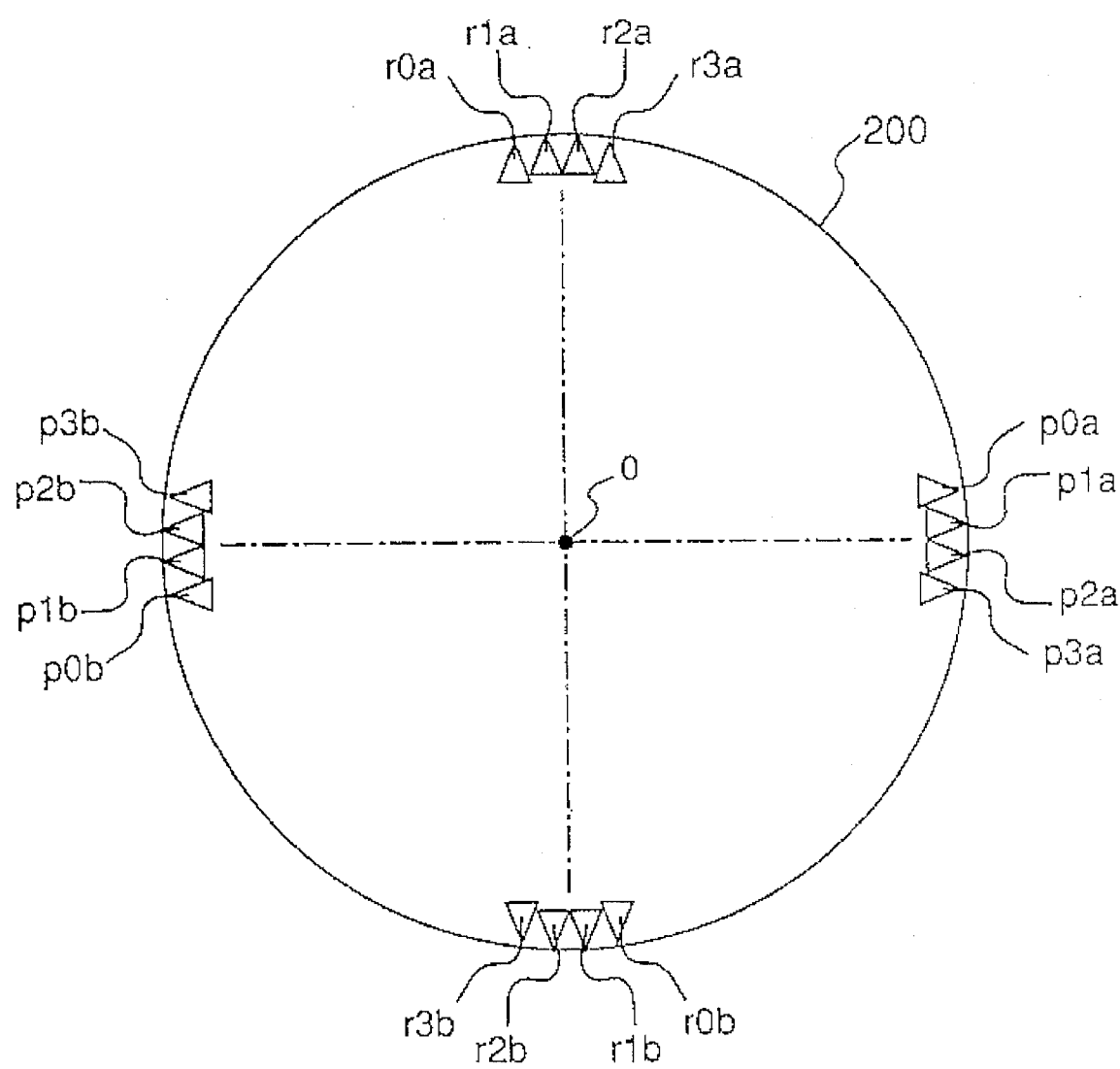
FIG. 4 is a schematic plan view of an arrangement of magnetic heads r0a through r3a and r0b through r3b of the digital VTR of the present preferred embodiment.

FIG. 4 shows an arrangement of the helical scan type magnetic heads which are used in the digital VTR of the present preferred embodiment.

Referring to FIG. 4, the first set of recording magnetic heads comprises recording magnetic heads r0a through r3a, while the second set of recording magnetic heads comprises recording magnetic heads r0b through r3b. In this case, the first and second sets of recording magnetic heads r0a through r3a and r0b through r3b are provided on a rotation head drum 200 so that the first set of recording magnetic heads r0a through r3a oppose to the second set of recording magnetic heads r0b through r3b with respect to the center point O of the rotation head drum 200. The first set of recording magnetic heads r0a through r3a is provided at a position so as to be slightly shifted in a form of steps, and further the second set of recording heads r0b through r3b is provided at another opposing position so as to be slightly shifted in a form of steps.

As shown in FIG. 4, it is to be noted that first and second sets of reproducing magnetic heads p0a through p3a and p0b through p3b are provided so that the first set of reproducing magnetic heads p0a through p3a oppose to the second set of reproducing magnetic heads p0b through p3b with respect to the center point 0 of the rotation head drum 200, and they are located at the positions rotated by 90 degrees about the center 0 of the rotation head drum 200 from the positions where the first and second sets of recording magnetic heads r0a through r3a and r0b through r3b.

In the above stage, the recording area of the digital audio signal is placed in the middle portion of each inclined track as divided into four sections. There can be recorded 4-channel digital audio signal, and as shown in FIG. 1, the 4-channel digital audio signal, corresponding to four audio sectors A1 through A4 as shown in FIG. 1, is recorded evenly in the above-mentioned digital audio signal recording area or sector which are divided into four sections or sectors. In other words, the audio signal is evenly and distributed recorded every field as follows:

(a) in an order of A1, A3, A2 and A4 in the first segment S1 from the lower end of the audio sectors;

(b) in an order of A2, A4, A1 and A3 in the second segment S2 from the lower end of the audio sectors;

(c) in an order of A3, A1, A4 and A2 in the third segment S3 from the lower end of the audio sectors; and (d) in an order of A4, A2, A3 and A1 in the fourth segment S4 from the lower end of the audio sectors.

Figure 5:
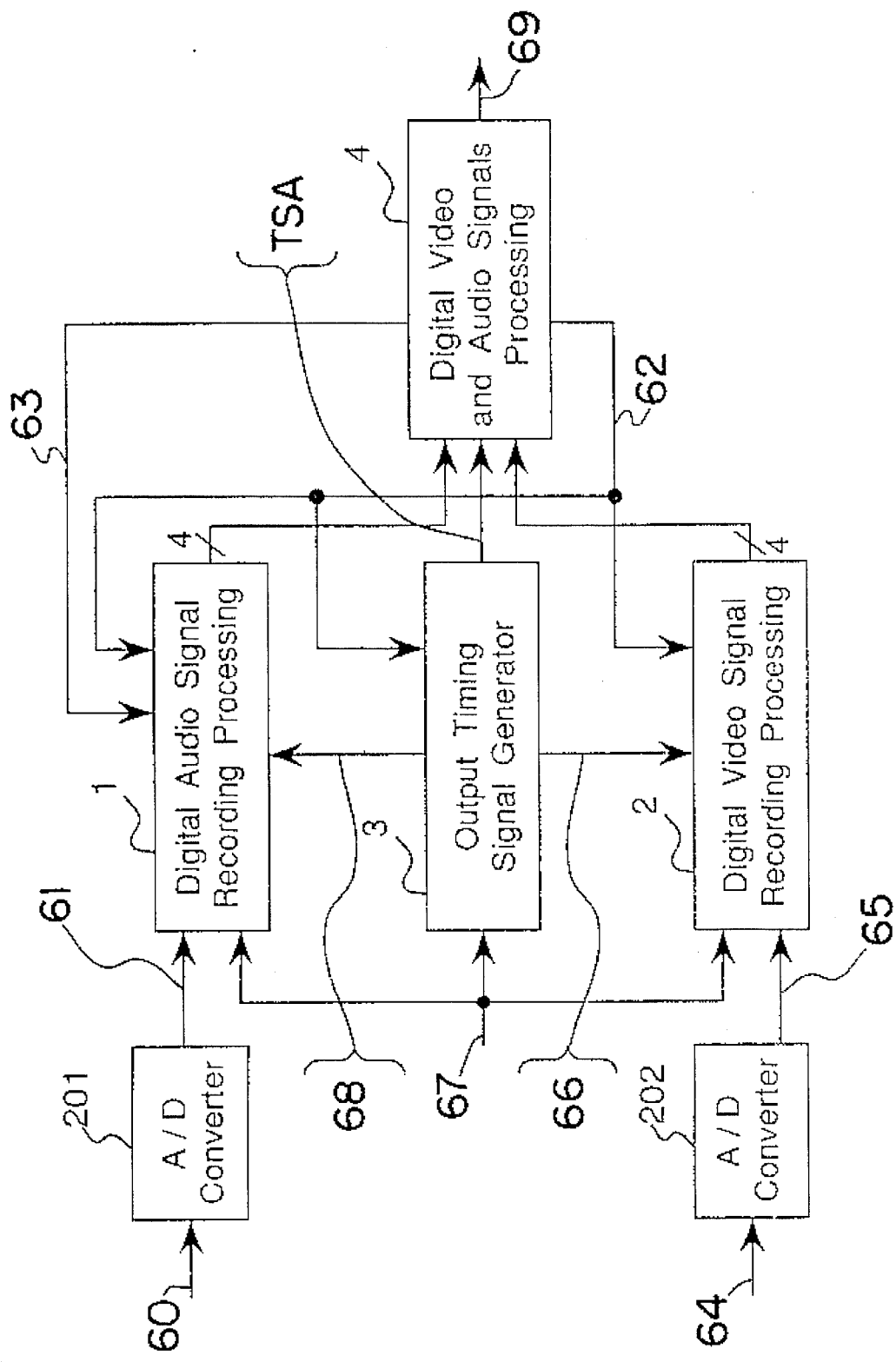
FIG. 5 is a block diagram of a digital signal recording processing section of the digital VTR of the present preferred embodiment.

FIG. 5 shows a digital signal recording processing section of the digital VTR in accordance with the preferred embodiment of the present invention.

Referring to FIG. 5, the digital signal recording processing section of the digital VTR comprises an analog to digital converters (referred to as A/D converters hereinafter) 201 and 202, a digital audio signal recording processing unit 1, a digital video signal recording processing unit 2, an output timing signal generator 3, and a digital video and audio signals processing unit 4.

The following describes the operation of the digital signal processing unit of the digital VTR of the present preferred embodiment.

An inputted analog audio signal 60 to be recorded is converted into a digital audio signal 61 by the A/D converter 201 according to a sampling clock which is synchronous with the field signal 67, and then the converted digital audio signal is inputted to the digital audio signal recording processing unit 1. The digital audio signal recording processing unit 1 executes a data shuffling process, an error correction code generating process, and the like for the inputted digital audio signal based on a field signal 67 representing the beginning of one field, a digital audio signal output timing signal generated and outputted from the output timing signal generator 3, a READ clock RCK 63 having a predetermined clock frequency fc and a READ clock RCK4 63 having a frequency 4fc which is four times the clock frequency fc, wherein the latter two READ clock RCK and RCK4 are generated and outputted from the digital video and audio signals processing unit 4.

On the other hand, an inputted analog video signal 64 to be recorded is converted into a digital video signal 65 by the A/D converter 202 according to a sampling clock which is synchronous with the field signal 67, and then the converted digital video signal is inputted to the digital video signal recording processing unit 2. The digital video signal recording processing unit 2 executes a data shuffling process, an error correction code generating process, and the like for the inputted digital video signal.

Since the digital video and audio signals are obtained by analog-to-digital converting according to the sampling clock synchronous with the same field signal 67, the digital video signal 67 outputted from the A/D converter 201 is synchronous with the digital audio signal 61 outputted from the A/D converter 202.

Figure 6:
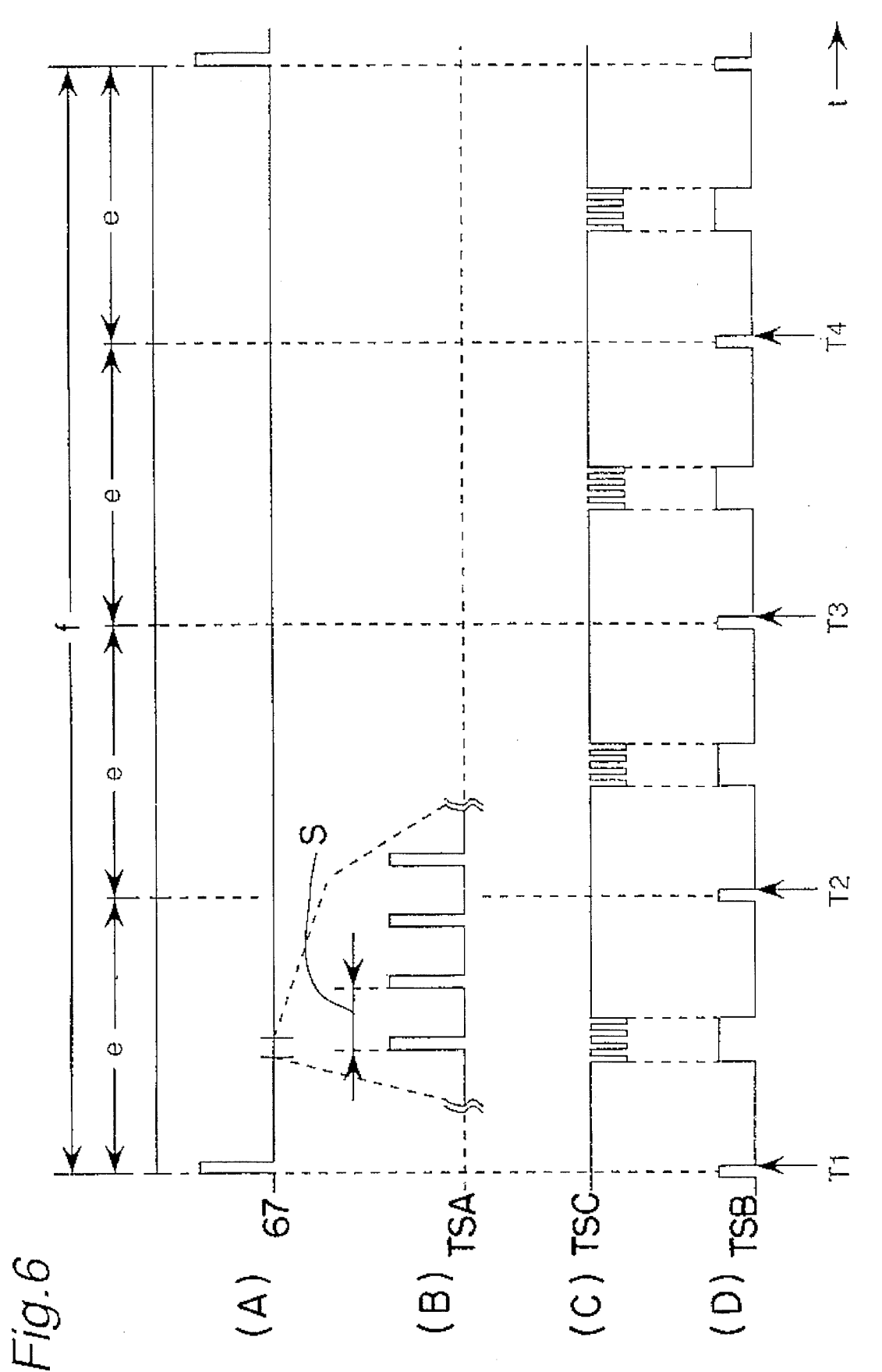
FIG. 6 is a timing chart showing a relationship among a field signal, a SYNC and ID insertion timing signal TSA, an output interval signal for digital audio signal TSC, and an output interval signal for digital video signal TSB, which are used in the digital VTR of the present preferred embodiment.

The output timing signal generator 3 receives not only a field signal synchronized with the inputted video signal but also the above-mentioned READ clock RCK, and then generates and outputs a digital audio signal output timing signal 68 and a digital video output timing signal 66 to the digital audio signal recording processing unit 1 and the digital video signal recording processing unit 2, respectively, using the field signal 67 used as a reference signal in a manner as shown in FIG. 6. The output timing signal generator 3 also outputs a SYNC and ID insertion timing signal TSA to the digital video and audio signals processing unit 4, which outputs the CH0–CH3 recording signal 69. In FIG. 6, s represents one SYNC block.

Figure 19:
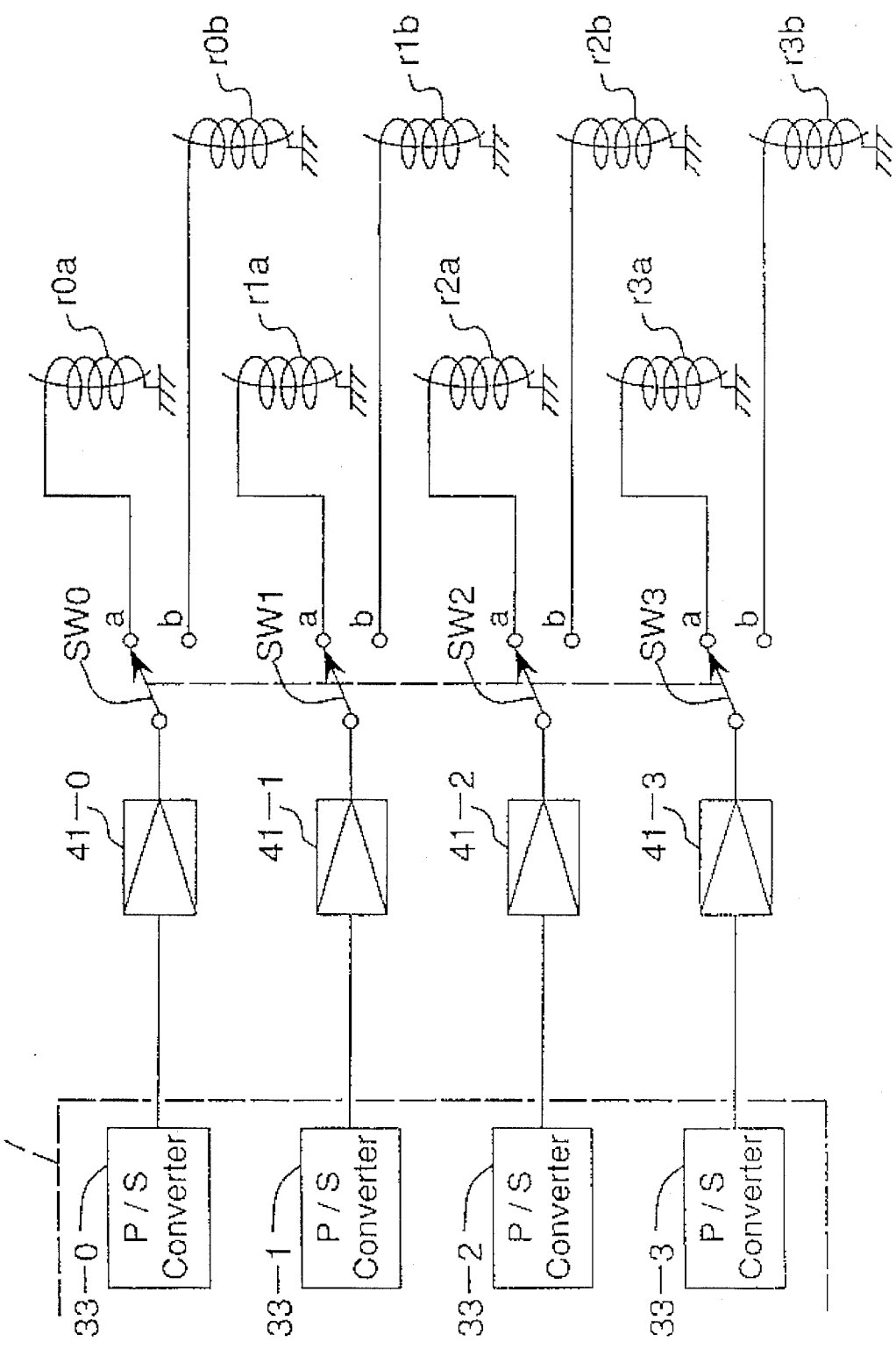
FIG. 19 is a schematic block diagram showing a connection between the digital video and audio signals processing unit 4 and recording magnetic heads r0a through r3a and r0b through r3b of the digital VTR of the preferred embodiment.

The digital audio signal recording processing unit 1 generates and outputs digital audio signals of four channels CH0 through CH3, including a generated error correction code, to the digital video and audio signals processing unit 4, sequentially in an order as shown in FIG. 1 for a time interval in which the digital audio output timing signal is at a low level. On the other hand, the digital video signal recording processing unit 2 generates and outputs digital video signals of four channels CH0 through CH3, including generated error correction code, to the digital video and audio signals processing unit 4 for a time interval in which the digital video output timing signal is at the low level. Further, the digital video and audio signals processing unit 4 generates again an error correction code and adds SYNC and ID signals to the inputted digital audio signal including the generated error correction code and digital video signal including the generated error correction code, so as to execute formatting the same for recording operation. Thereafter, after executing digital modulation on the digital video and audio signals, the digital video and audio signals processing unit 4 outputs the resulting recording signals of four channels CH0 through CH3, to the following recording system as shown in FIG. 19, thereby recording the recording signals of four channels on the magnetic tape 100 having a width of ½ inch.

(a) The CH0 recording signal is outputted through a recording amplifier 41-0 and a head switch SW0 alternately to either the recording magnetic head r0a or the recording magnetic head r0b.

(b) The CH1 recording signal is outputted through a recording amplifier 41-1 and a head switch SW1 alternately to either the recording magnetic head r1a or the recording magnetic head r1b.

(c) The CH2 recording signal is outputted through a recording amplifier 41-2 and a head switch SW2 alternately to either the recording magnetic head r2a or the recording magnetic head r2b.

(d) The CH3 recording signal is outputted through a recording amplifier 41-3 and a head switch SW3 alternately to either the recording magnetic head r3a or the recording magnetic head r3b.

The head switches SW0 through SW3 are alternately switched over between contacts "a" and "b" each of the respective segments S1 through S4.

It is assumed that, in the present preferred embodiment, servo control is effected with the field signal synchronized with the inputted video signal used as a reference signal so that data read at the data read start timings T1, T2, T3 and T4 of each segment as shown in FIG. 6 are recorded respectively from the recording start positions X1, X2, X3 and X4 of the respective inclined tracks as shown in FIG. 1. With the above-mentioned arrangement, the recording area of the digital video and audio signals in the unit of one field is controlled so as to start from the lower end X1, X2, X3 or X4 and thereafter to end at the upper end Y1, Y2, Y3 or Y4 of each inclined track, respectively, in a manner as shown in FIG. 1, with which the digital audio signal is recorded in the middle portion of each inclined track.

Figure 12:
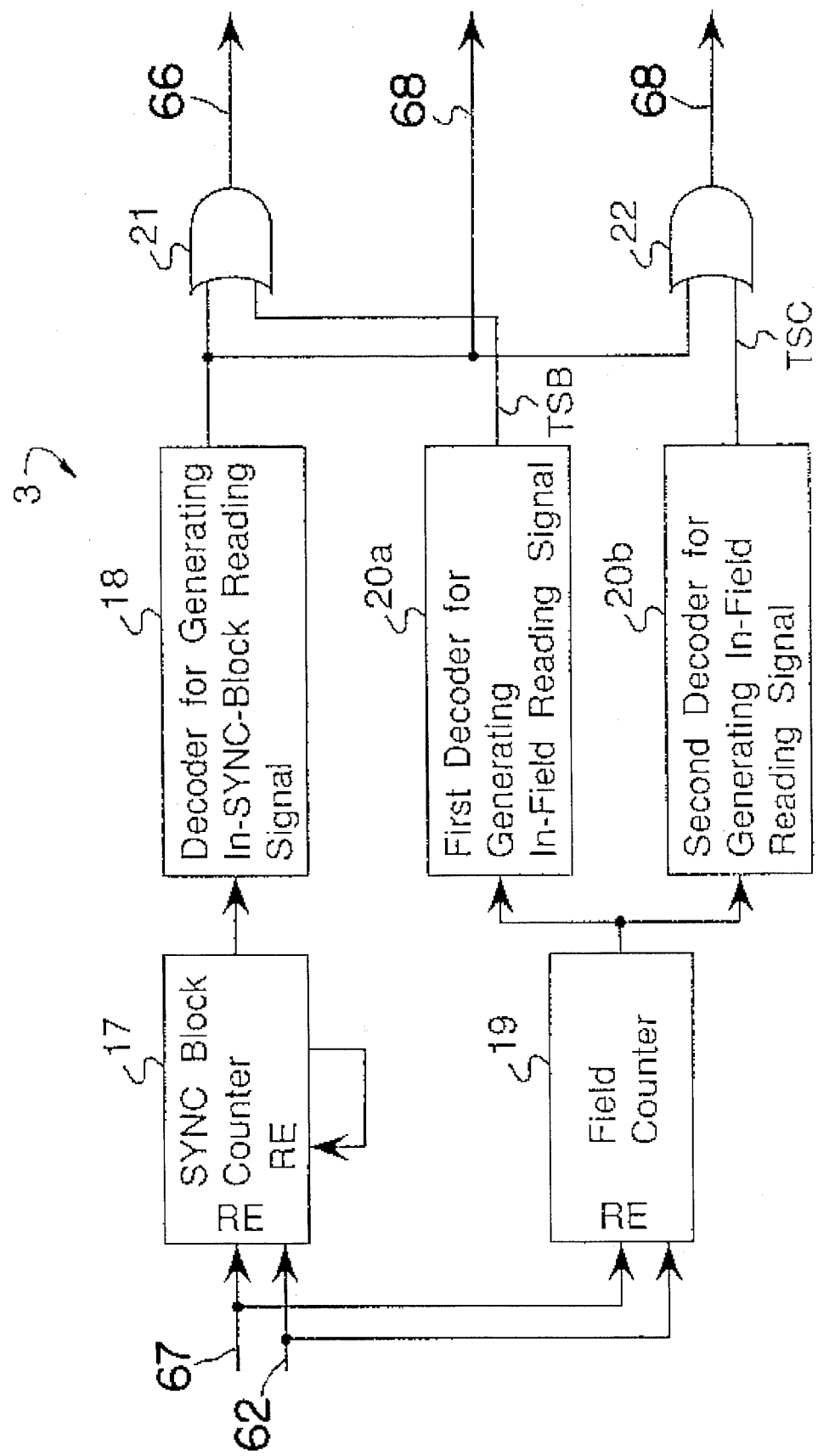
FIG. 12 is a schematic block diagram of an output timing signal generator 3 of the digital VTR of the preferred embodiment.

FIG. 12 shows a composition of the output timing signal generator 3 shown in FIG. 5.

Referring to FIG. 12, the output timing signal generator 3 comprises a SYNC block counter 17, a decoder for generating in-SYNC-block reading signal 18 (referred to as a decoder 18 hereinafter), a field counter 19, a first decoder for generating in-field reading signal 20a (referred to as a first decoder 20a hereinafter), a second decoder for generating in-field reading signal 20b (referred to as a second decoder 20b hereinafter), and two OR gates 21 and 22.

The field signal 67 is inputted to both of the SYNC block counter 17 and the field counter 19, and the READ clock RCK is inputted to both of the SYNC block counter 17 and the field counter 19.

The SYNC block counter 17 is reset to zero in accordance with the field signal 67, and counts pulses of the READ clock RCK 62 with a period of one SYNC block since the SYNC block counter 17 resets itself for itself every one SYNC block. The count value of the SYNC block counter 17 is outputted to the decoder 18, which decodes the inputted count value so as to generate the SYNC and ID insertion timing signal TSA (shown in FIG. 6) representing an insertion time interval of the ID signal, which is an identification signal of the SYNC and the SYNC block, wherein the SYNC and ID insertion timing signal TSA has a period of one SYNC block.

The field counter 19 is reset to zero in accordance with the field signal, and counts pulses of the READ clock RCK with a period of one field. The count value of the field counter 19 is outputted to the first and second decoders 20a and 20b. The first and second decoders 20a and 20b decode the inputted count value, respectively, so as to generate an output interval signal for digital video signal TSB and an output interval signal for digital audio signal TSC which are shown in FIG. 6. In this case, the low level of the output interval signal for digital video signal TSB represents a time interval when the digital video signal is to be recorded, and corresponds to the two video sectors respectively located at the upper and lower ends of each inclined track as shown in FIG. 1. The low level of the output interval signal for digital video signal TSC represents a time interval when the digital audio signal is to be recorded, and corresponds to the four audio sectors respectively located in the middle portion of each inclined track as shown in FIG. 1

Figure 13:
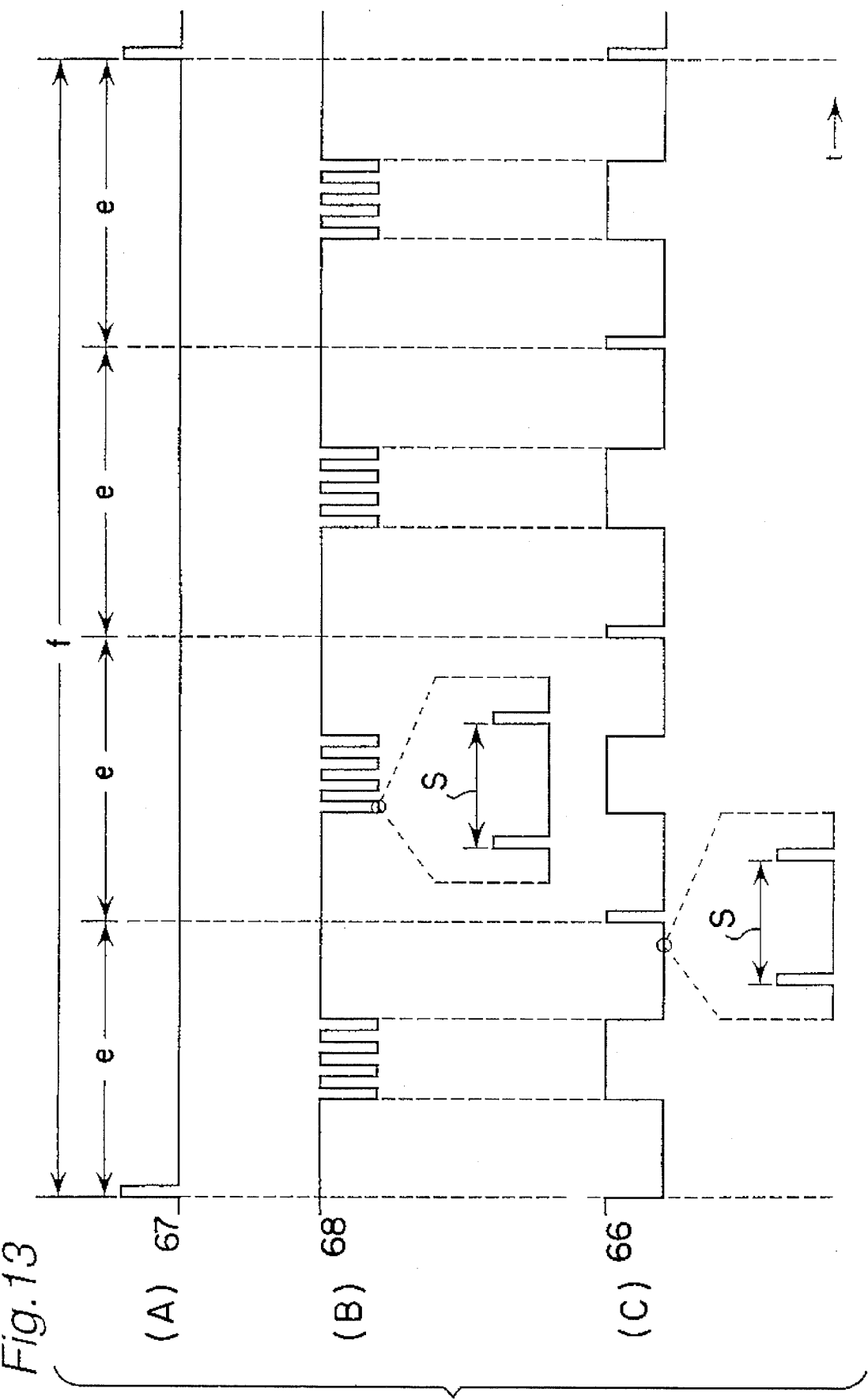
FIG. 13 is a timing chart showing a relationship among the field signal, a digital audio signal output timing signal and a digital video signal output timing signal which are used in the digital VTR of the preferred embodiment.
Figure 14:
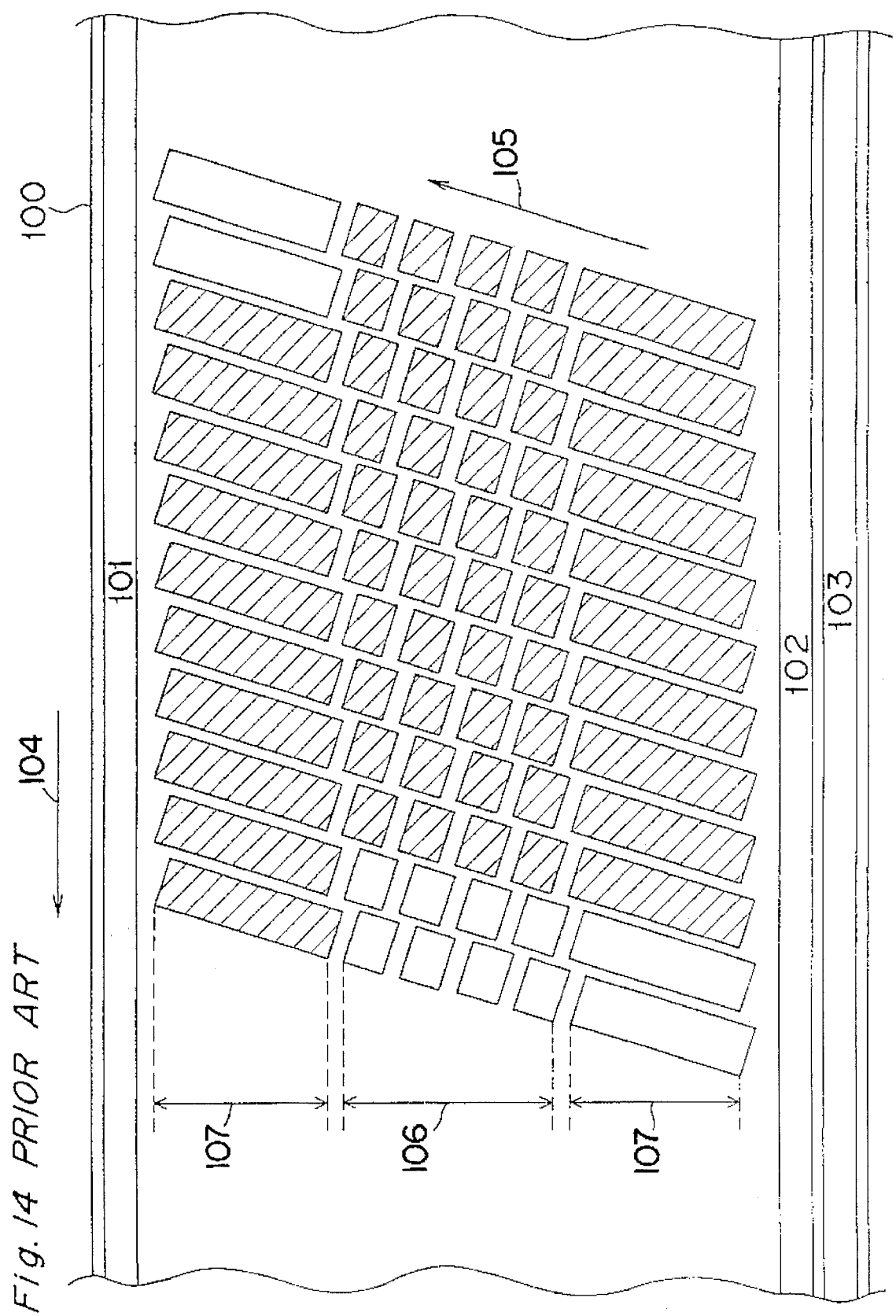
FIG. 14 is a schematic front view of a tape format showing a method of recording digital video and audio signals which is used in a conventional D-1 type digital VTR.

The SYNC and ID insertion timing signal TSA outputted from the decoder 18 is inputted to the digital video and audio signals processing unit 4 as shown in FIG. 4. The SYNC and ID insertion timing signal TSA and the output interval signal for digital video signal TSB are inputted to the OR gate 21, which performs an OR operation of both the signals and outputs the signal of the result of the OR operation as the digital video signal output timing signal 66, which is inputted to the digital video signal recording processing unit 2 as shown in FIG. 5. Since the above-mentioned OR operation is performed by the OR gate 21, the digital video signal output timing signal 66 includes pluses with a period of one SYNC block for a time interval of the low level thereof, as shown in FIG. 13. The SYNC and ID insertion timing signal TSA and the output interval signal for digital audio signal TSC are inputted to the OR gate 22, which performs an OR operation of both the signals and outputs the signal of the result of the OR operation as the digital audio signal output timing signal 68, which is inputted to the digital audio signal recording processing unit 1 as shown in FIG. 5. Since the above-mentioned OR operation is performed by the OR gate 22, the digital audio signal output timing signal 68 includes pulses with a period of one SYNC block for a time interval of the low level thereof, as shown in FIG. 13.

Figure 9:
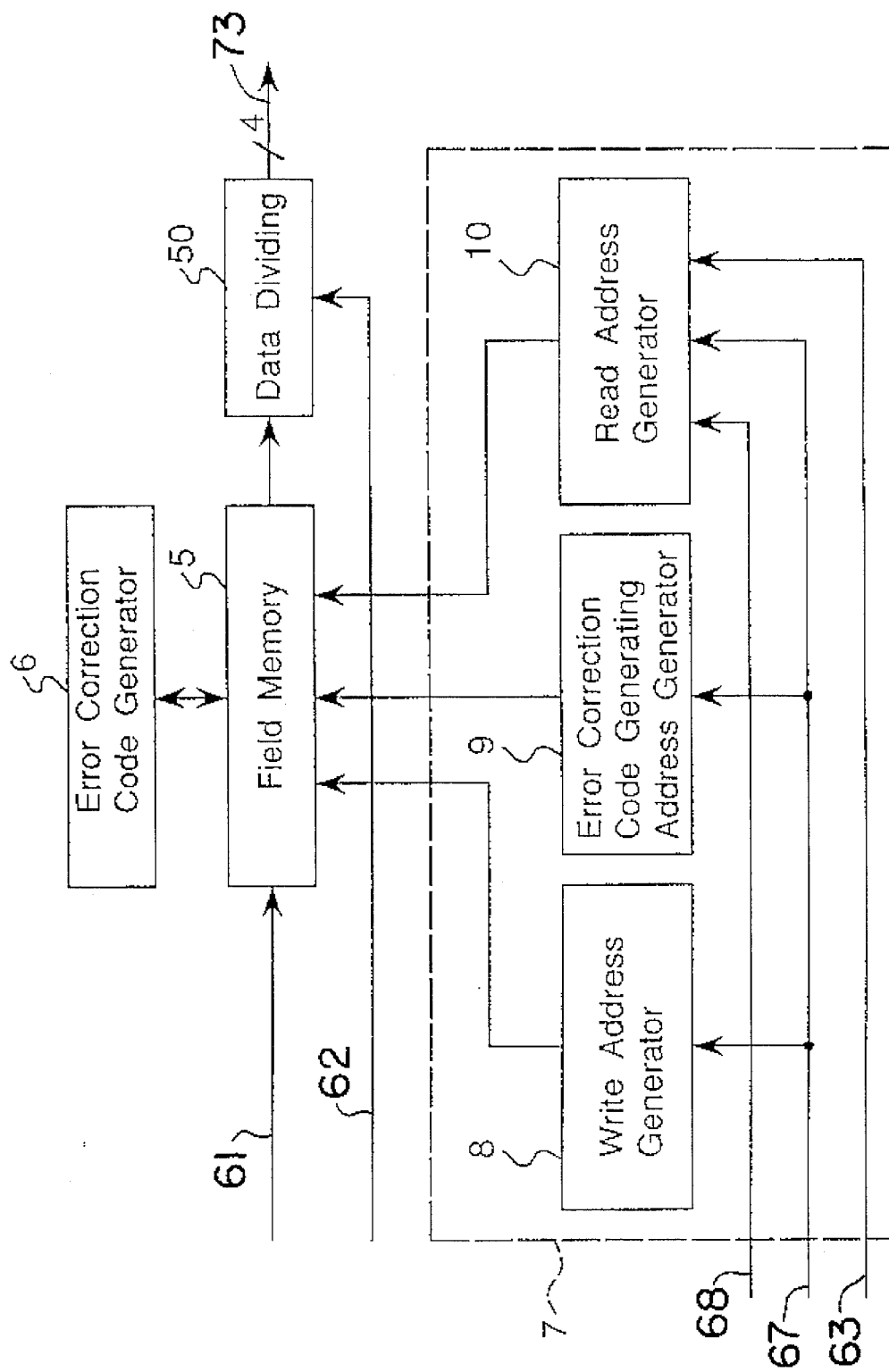
FIG. 9 is a schematic block diagram of a digital audio signal recording processing unit 1 of the digital VTR of the preferred embodiment.

FIG. 9 shows a composition of the digital audio signal recording processing unit 1 shown in FIG. 5.

Referring to FIG. 9, the digital audio signal recording processing unit 1 comprises a field memory 5 composed of a RAM having a memory capacity required for storing digital audio signal data of one field, a memory controller 7, an error correction code generator 6, and a data dividing circuit 50, wherein the memory controller 7 comprises a write address generator 8, an error correction code generating address generator 9, and a read address generator 10.

In the digital audio signal recording processing unit 1, the inputted digital audio signal 61 is subjected to a predetermined data shuffling process according to a READ address generated by the read address generator 8, and then the shuffled digital audio signal is written into the field memory 5. In this case, the write address generator 8 generates the READ address for temporarily and sequentially writing the digital audio signal into the field memory 5 every one field time interval based on the field signal 67 shown in FIG. 6. After the write operation into the field memory 5 has been completed, a predetermined number of digital audio data are read out from the field memory 5 according to an error correction code generating address which is generated based on the field signal 67 by the error correction code generating address generator 9, and then the predetermined number of read-out digital audio data are outputted to the error correction code generator 6. The error correction code generator 6 generates an error correction code based on the inputted digital audio data, and outputs the error correction code to the field memory 5. The outputted error correction code is written into the field memory 5 according to the error correction code generating address.

As described above, the digital audio signal recording processing unit 1 generates and outputs the digital audio signals of four channels CH0 through CH3 68, including a generated error correction code, to the digital video and audio signals processing unit 4, sequentially in an order as shown in FIG. 1 for a time interval in which the digital audio output timing signal 68 is at a low level. At that time, in order to evenly and distributedly record the respective channel data of the digital audio signals into the four digital audio signal recording area or sector located in the middle part of the inclined track, the read address generator 10 is provided as shown in FIG. 10, for the purpose of reading out the digital audio signal data from the field memory 5.

Figure 10:
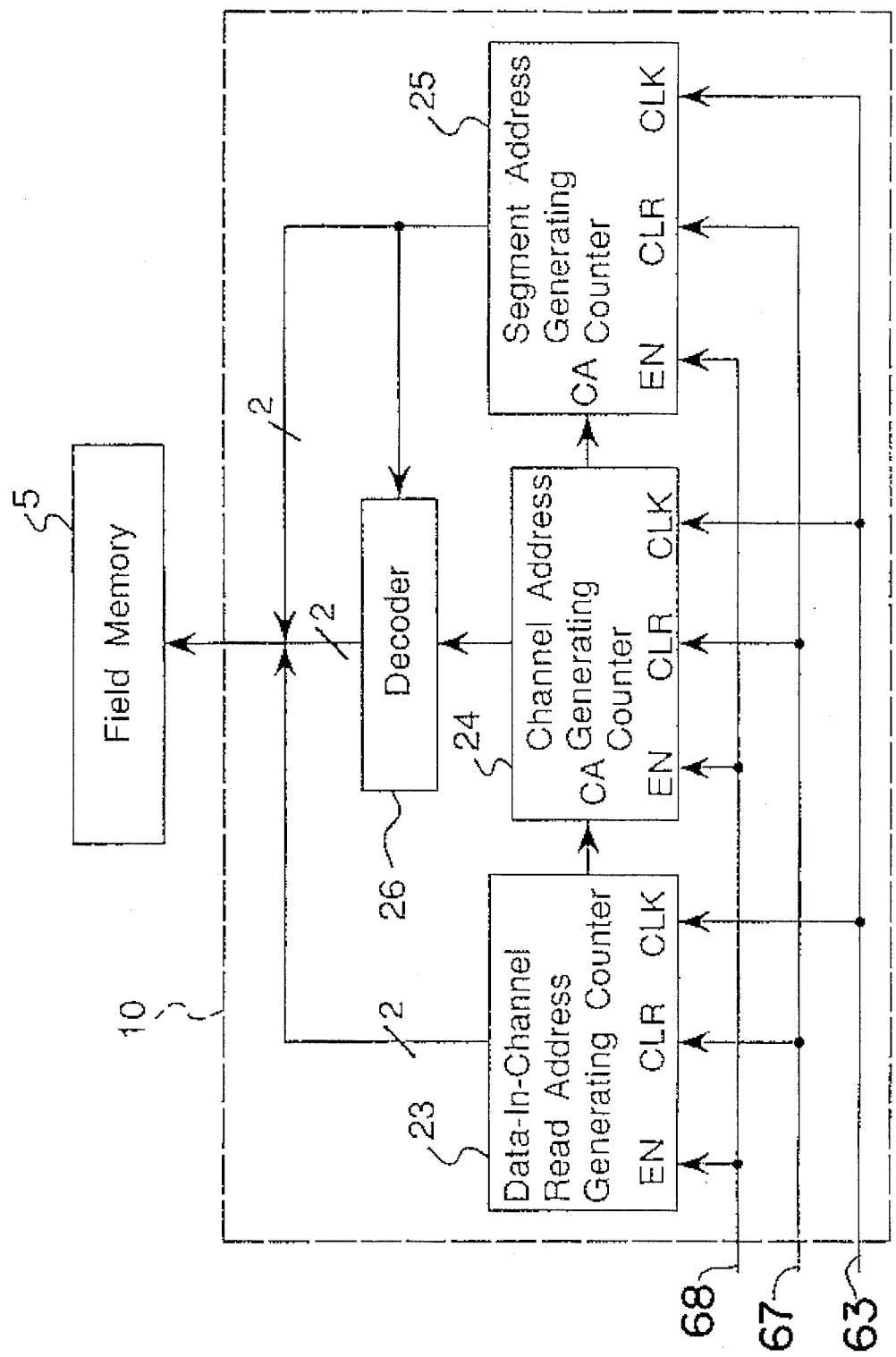
FIG. 10 is a schematic block diagram of a read address generator 10 shown in FIG. 9.

Referring to FIG. 10, the read address generator 10 of the digital audio signal recording processing unit 1 shown in FIG. 9 comprises the followings:

(a) a data-in-channel read address generating counter 23 for generating a data-in-channel read address for reading out the digital audio signal data within one channel in one segment based on the field signal, the digital audio signal output timing signal outputted from the output timing signal generator 3, and the READ clock RCK4 outputted from the digital video and audio signals processing unit 4;

(b) a channel address generating counter 24 for generating a channel address in one segment for dividing the read-out digital audio signal data into four channels CH0 through CH3, based on the field signal, the digital audio signal output timing signal, and the READ clock RCK4;

(c) a segment address generating counter 25 for generating a segment address for performing segmentation of the read-out digital audio signal data into four segments, based on the field signal, the digital audio signal output timing signal, and the READ clock RCK4; and (d) a decoder 26 for decoding the channel address generated by the channel address generating counter 24 and the segment address generated by the segment address generating counter 25 so as to generate and output a further channel address.

The digital audio signal output timing signal 68 shown in FIG. 13 is inputted to the read address generator 10. The above-mentioned three address counters 23, 24 and 25 are connected so that a carry signal representing an overflow of the count value outputted from the data-in-channel read address generating counter 23 to a carry-in terminal of the channel address generating counter 24, and further, a carry signal representing an overflow of the count value outputted from the channel address generating counter 24 to a carry-in terminal of the segment address generating counter 25.

For a time interval in which the digital audio signal output timing signal 68 is at the low level, the above-mentioned three address counters 23, 24 and 25 counts pulses of the READ clock RCK4, and outputs the count value thereof and the data decoded by the decoder 26 from the count value thereof, to the field memory 9 as a read-out address, thereby reading out the digital audio signal from the field memory. At that time, the three address counters 25 through 23 are reset in accordance with the inputted field signal, and generate and outputs an initial segment address 0, an initial channel address 0 and an initial data-in-channel read address 0, respectively, so as to read out the first data of the channel A1 (channel address 00 in binary notation=0 in decimal notation) of the segment S1.

Figure 17:
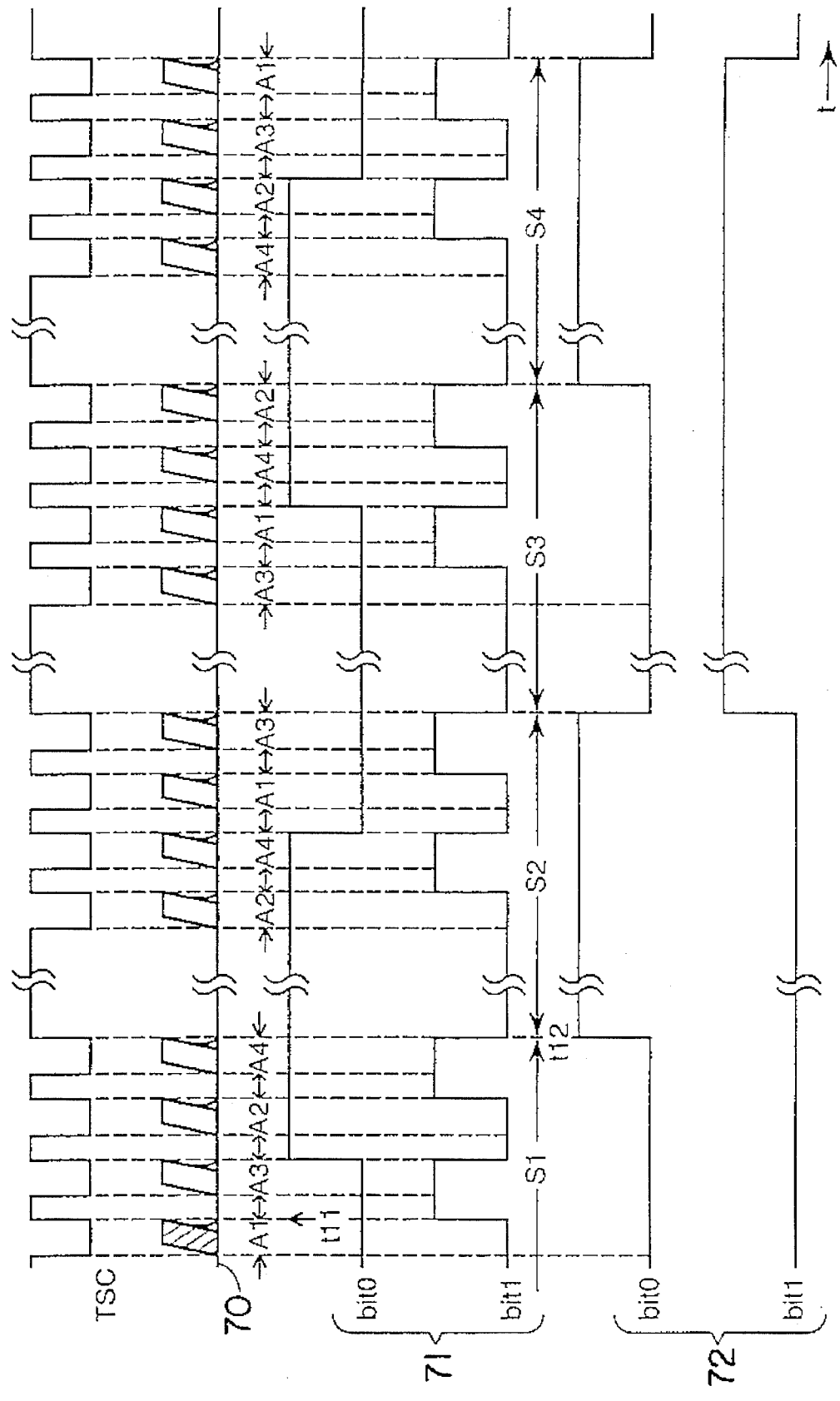
FIG. 17 is a timing chart showing a relationship among the output interval signal for digital audio signal TSC, a data-in-channel read address, a channel address and a segment address which are used in the digital VTR of the preferred embodiment.

Thereafter, as shown in FIG. 17, for a time interval in which the digital audio signal output timing signal 68 is at the low level, the data-in-channel read address generating counter 23 counts pulses of the READ clock RCK4 so as to read out the digital audio signal data from the first data of the channel A1 of the segment S1 to the last data thereof, and outputs the count value thereof as a data-in-channel read address to the field memory 5 as shown in hatching portions of FIG. 17. Simultaneously when the last data of the channel A1 of the segment S1, the data-in-channel read address generating counter 23 generates and outputs a carry signal to the carry-in terminal of the channel address generating counter 24, and resets itself for itself so as to reset the count value thereof to zero in order to read out the first data of the next read-out channel. Then, when the channel address generating counter 24 receives the carry signal from the data-in-channel read address generating counter 23, the channel address generating counter 24 increments the count value by one, and outputs the incremented count value to the decoder 26. The decoder 26 decodes the count value counted by the channel address generating counter 24 and the count value counted by the segment address generating counter 25, so as to generate and output an address 2 representing the channel A3 at a timing t11, where 71 represents the channel address, of FIG. 17.

Thereafter, the data-in-channel read address generating counter 23 generates the data-in-channel read addresses 70 so as to read out all the digital audio signal data of the channel A3 (channel address 10 in binary notation=2 in decimal notation) of the segment S1, and then outputs a carry signal to the channel address generating counter 24 and resets itself for itself so as to reset the count value thereof to zero. Then, as shown in FIG. 17, the digital audio signal data of the channel A2 (channel address 01 in binary notation=1 in decimal notation) and the channel A4 (channel address 11 in binary notation=3 in decimal notation) are read out in a manner similar to that as described above. As a result, all the digital audio signal data of the segment S1 have been read out.

Thereafter, the channel address generating counter 24 outputs a carry signal to the segment address generating counter 25, and then resets itself for itself so as to reset the count value to zero. When the segment address generating counter 25 receives the carry signal, the segment address generating counter 25 increments the count value thereof by one, and then outputs the address 1 representing the segment S2 at a timing t12, where 72 represents the segment address, of FIG. 17. Thereafter, as described above, the digital audio signal data are read out from the field memory 5, in the following order in each segment:

(a) in the segment S2 (segment address 01 in binary notation=1 in decimal notation), sequentially, in an order of the channel A2 (channel address 01 in binary notation=1 in decimal notation), the channel A4 (channel address 11 in binary notation=3 in decimal notation), the channel A1 (channel address 00 in binary notation=0 in decimal notation), and the channel A3 (channel address 10 in binary notation=2 in decimal notation);

(b) in the segment S3 (segment address 10 in binary notation=2 in decimal notation), sequentially, in an order of the channel A3 (channel address 10 in binary notation=2 in decimal notation), the channel A1 (channel address 00 in binary notation=0 in decimal notation), the channel A4 (channel address 11 in binary notation=3 in decimal notation), and the channel A2 (channel address 10 in binary notation=1 in decimal notation); and (c) in the segment S4 (segment address 11 in binary notation=3 in decimal notation), sequentially, in an order of the channel A4 (channel address 11 in binary notation=3 in decimal notation), the channel A2 (channel address 01 in binary notation=1 in decimal notation), the channel A3 (channel address 10 in binary notation=2 in decimal notation), and the channel A1 (channel address 00 in binary notation=0 in decimal notation).

The digital audio signal data read out from the field memory 5 are inputted in synchronous with the READ clock RCK4, to the data dividing circuit 50. Then the data dividing circuit 50 divides the inputted digital audio signal data into four signal data corresponding to the recording channels CH0 through CH3 in the input order, and latches them based on the READ clock RCK, then outputting them to the digital video and audio signals processing unit 4, in synchronous with the READ clock RCK.

Figure 11:
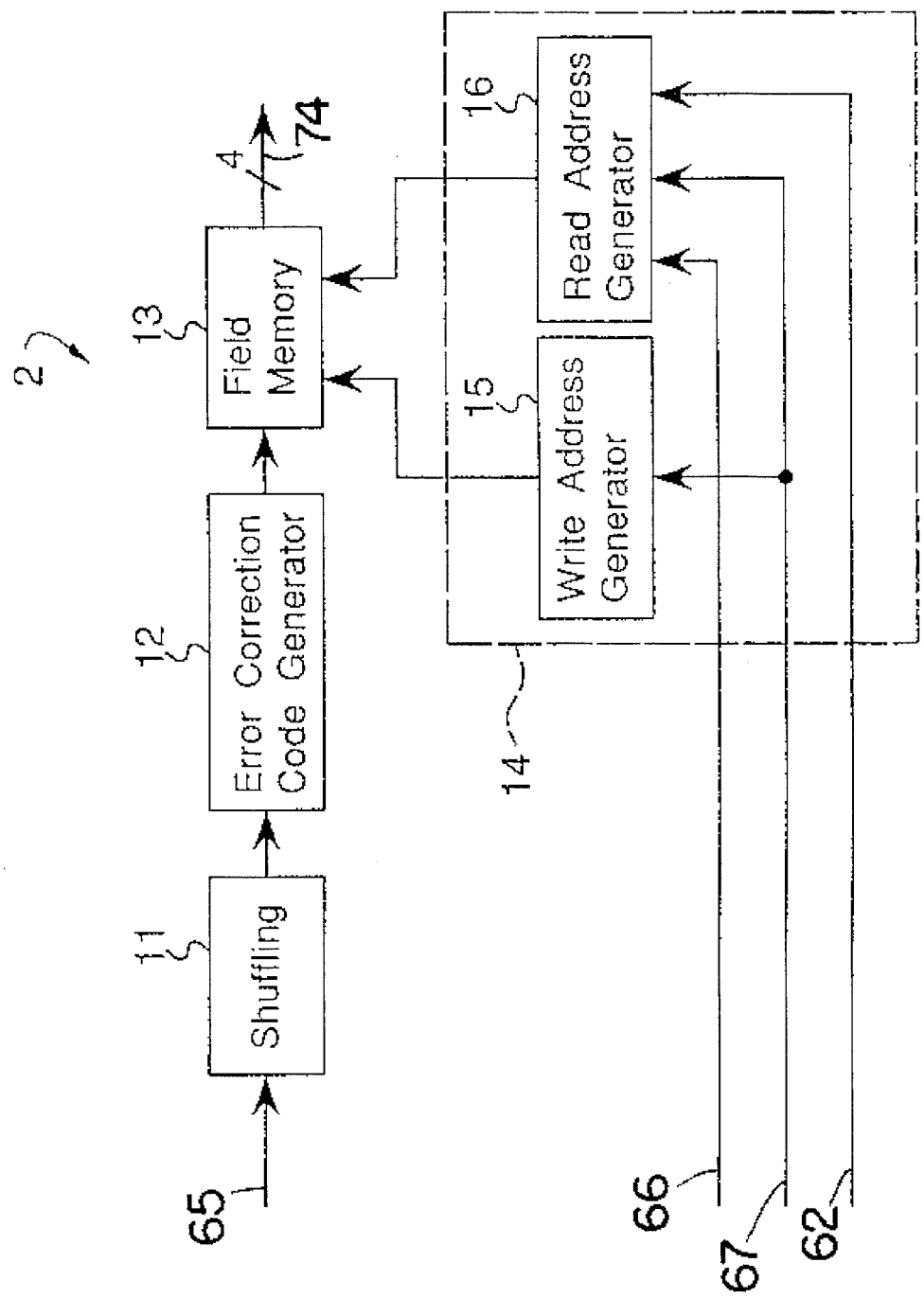
FIG. 11 is a schematic block diagram of a digital video signal recording processing unit 2 of the digital VTR of the preferred embodiment.

FIG. 11 shows a composition of the digital video signal recording processing unit 2 shown in FIG. 5.

Referring to FIG. 11, the digital video signal recording processing unit 2 comprises a shuffling circuit 11, an error correction code generator 12, a field memory 13, and a memory controller 14, wherein the memory controller 14 comprises a write address generator 15, and a read address generator 16.

In the digital video signal recording processing unit 2, the inputted digital video signal 65 is inputted to the shuffling circuit 11, and is subjected to a data shuffling process every one scanning line, then the data shuffled digital video signal is outputted to the error correction code generator 12. The error correction code generator 12 generates and adds an error correction code into the inputted shuffled digital video signal every one scanning line, and then outputs the processed digital video signal including the error correction code to the field memory 13. Thereafter, the memory controller 14 temporarily and sequentially writes the digital video signal and the error correction code inputted to the field memory 13 according to a write address generated by the write address generator 15. At that time, the field memory 13 is composed of four memories corresponding to the four recording channels CH0 through CH3, and dividedly stores the digital video signal and the error correction code into the four memories thereof every one field based on the field signal 67 as shown in FIG. 6 which is inputted to the write address generator 15.

To the read address generator 16, the following signals are inputted:

(a) the digital video signal output timing signal 66 outputted from the output timing signal generator (b) the field signal 67; and (c) the READ clock RCK 62 outputted from the digital video and audio signals processing unit 4.

Figure 15:
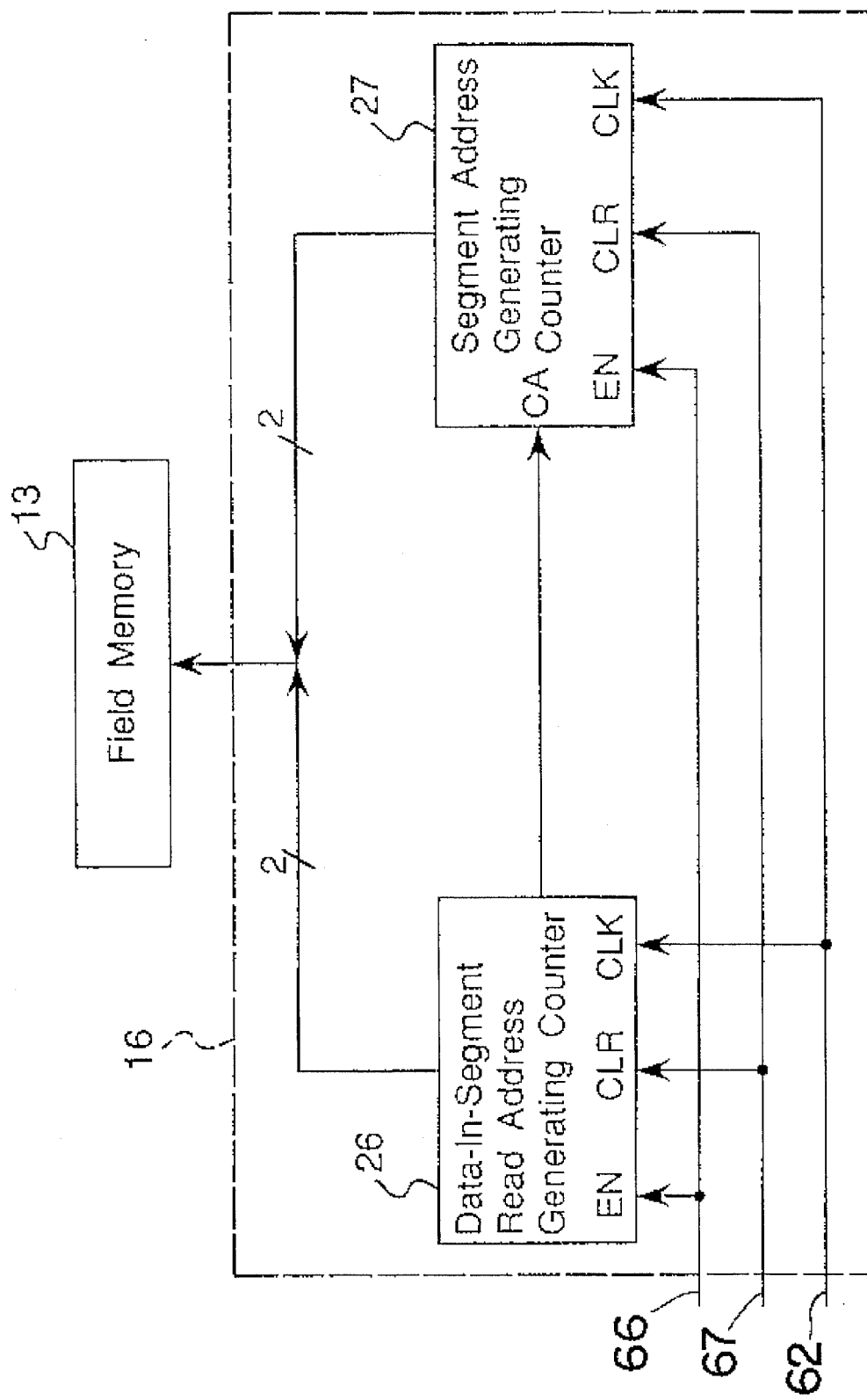
FIG. 15 is a schematic block diagram of a read address generator 16 shown in FIG. 11.

FIG. 15 shows a composition of the read address generator 16 shown in FIG. 11.

Referring to FIG. 15, the read address generator 16 comprises a data-in-segment read address generating counter 26 and a segment address generating counter 27. To both of the data-in-segment read address generating counter 26 and the segment address generating counter 27, the following signals are inputted:

(a) the digital video signal output timing signal 66 outputted from the output timing signal generator 3;

(b) the field signal 67; and (c) the READ clock RCK 62

For a time interval of the low level of the digital video signal output timing signal, both of the two address generating counters 26 and 27 count pulses of the READ clock RCK 62, and then output the count values as the read address to the field memory 13. In accordance with the read address from the read address generator 16, the digital video signal 65 is read out every recording channel, from the four memories of the field memory 13.

Figure 18:
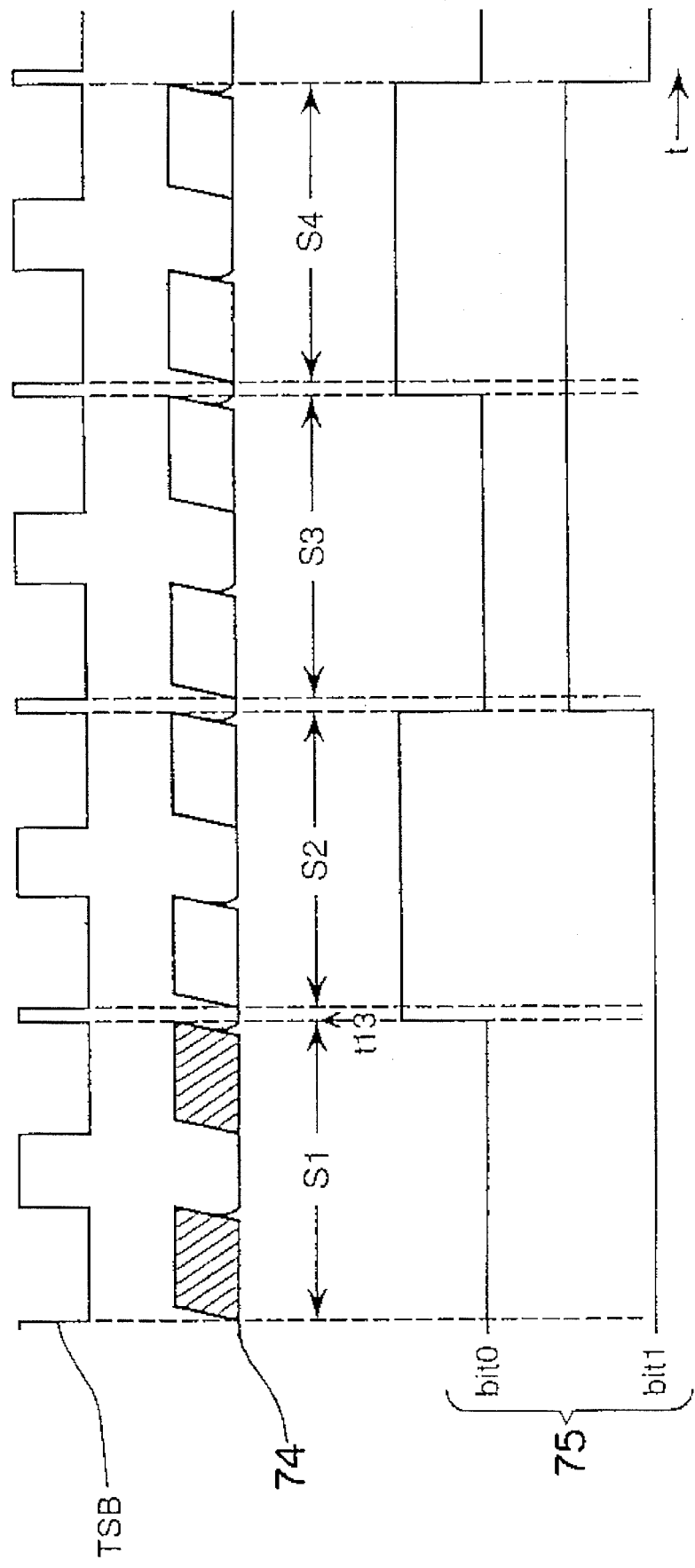
FIG. 18 is a timing chart showing a relationship among the output interval signal for digital video signal TSB, a data-in-segment read address and a segment address which are used in the digital VTR of the preferred embodiment.

In this case, the two address generating counters 26 and 27 are reset to zero in accordance with the inputted field signal every field, and then output an initial read address including a data-in-segment read address 0 and a segment address 0 to the field memory 13. Thereafter, as shown in FIG. 18, the data-in-segment read address generating counter 26 counts the pulses of the READ clock RCK 62, and then outputs the count value thereof as the data-in-segment read address 74 as shown in the hatching portion of FIG. 18, for the time interval of the low level of the digital video signal output timing signal 66, so as to sequentially read out the first data to the last data of the segment S1 of the digital video signal data from the field memory 5. After reading out the digital video signal data of the segment S1, the data-in-segment read address generating counter 26 outputs a carry signal to the segment address generating counter 27, and then resets itself for itself in order to read out the first data of the segment S2 from the field memory 5. In accordance with the carry signal outputted from the data-in-segment read address generating counter 26, the segment address generating counter 27 increments the count value by one, and then outputs the segment address (address value 01 in binary notation=1 in decimal notation) representing the segment S2 at a timing t13, where 75 represents the segment address, of FIG. 18. Thereafter, in a manner similar to that as describe above, the read address generator 16 outputs the read address for a time interval of the low level of the inputted digital video signal output timing signal 66, so as to read out the digital video signal data including the generated error correction code from the field memory to the digital video and audio signals processing unit 4.

Figure 16:
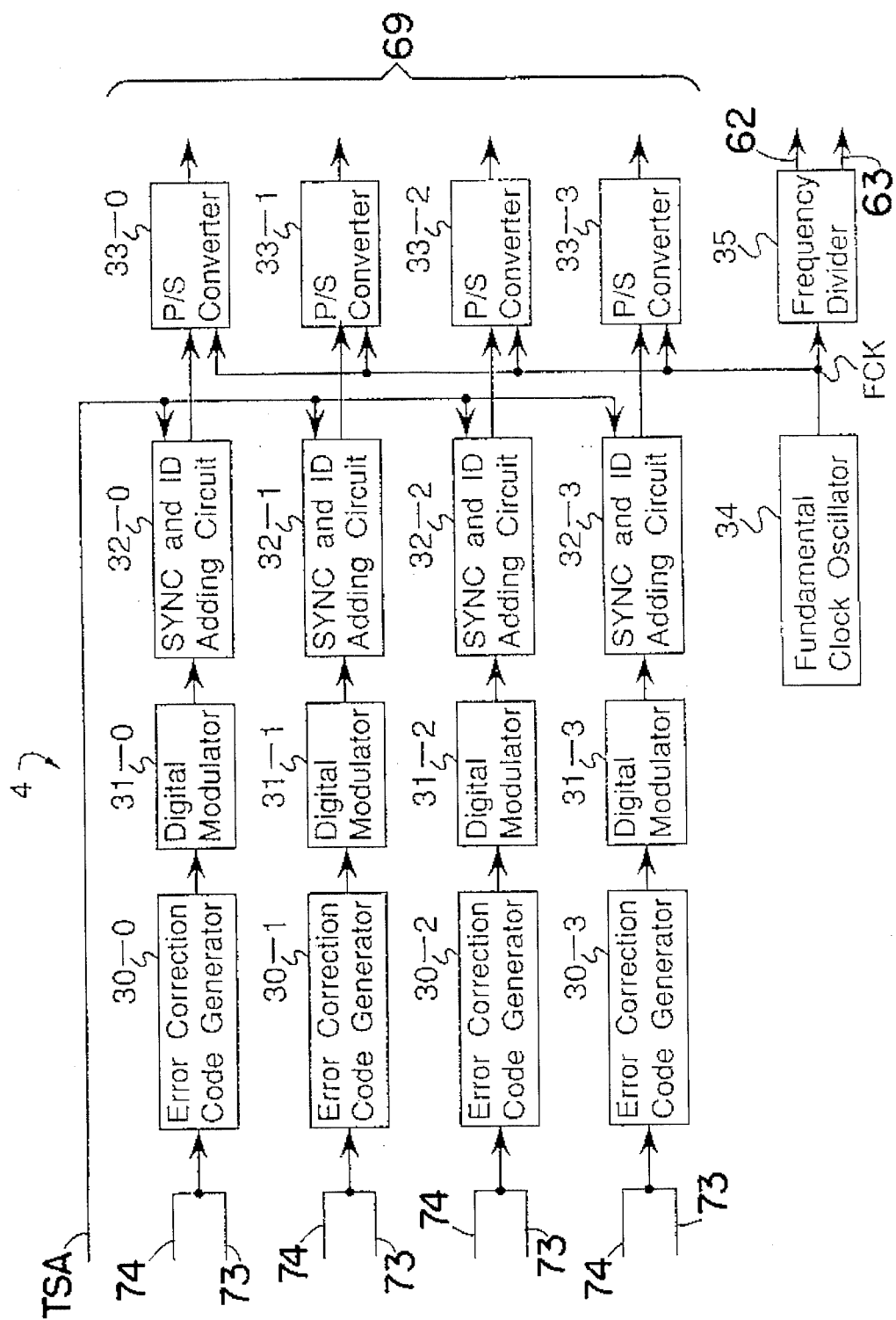
FIG. 16 is a schematic block diagram of a digital video and audio signals processing unit 4 shown in FIG. 5.

FIG. 16 shows a composition of the digital video and audio signals processing unit 4 shown in FIG. 5.

Referring to FIG. 16, the digital video and audio signals processing unit 4 comprises the followings:

(a) four error correction code generators 30-0 through 30-3;

(b) four digital modulators 31-0 through 31-3;

(c) four SYNC and ID adding circuits 32-0 through 32-3;

(d) four parallel to serial converters (referred to as P/S converters hereinafter) 33-0 through 33-3;

(e) a fundamental clock oscillator 34; and (f) a frequency divider 35.

The error correction code generators 30-0 through 30-3 perform generation of the error correction code and adding the generated error correction code again every recording channel, onto the inputted digital audio signals including the error correction codes and the inputted digital video signals including the error correction codes which are inputted being divided every recording channel, and then, output the processed signals to the digital modulators 31-0 through 31-3. The digital modulators 31-0 through 31-3 perform predetermined digital modulation on the inputted digital video and audio signals 74 and 73 respectively, including the error correction codes, and then output the digital modulated signals to the SYNC and ID adding circuits 32-0 through 32-3. Further, the SYNC and ID adding circuits 32-0 to 32-3 insert the SYNC and ID signals into the inputted digital signals, respectively, for a time interval of the high level of the SYNC and ID insertion timing signal outputted from the output timing signal generator 3, so as to perform recording format thereof, and then output them to the P/S converters 33-0 through 33-3.

On the other hand, the fundamental clock generator 34 generates and outputs a fundamental serial clock FCK having a predetermined recording frequency to the frequency divider 35, and the four P/S converters 33-0 through 33-3. The frequency divider 35 divides the frequency of the inputted fundamental serial clock, so as to generate and output not only the READ clock RCK 62 having the predetermined read clock frequency fc but also the READ clock RCK4 63 having a frequency 4fc of four times the read clock frequency fc. The read clock RCK 62 is outputted to the digital audio signal recording processing unit 1, the output timing signal generator 3, and the digital video signal recording processing unit 2, while the read clock RCK4 63 is outputted to the digital audio signal recording processing unit 1.

Further, the P/S converters 33-0 through 33-3 convert the inputted recording formatted parallel signals including the digital video and audio signals and the error correction codes, into serial recording signals of four channels CH0 through CH3, every recording channel, according to the fundamental serial clock outputted from the fundamental clock oscillator 34, and then output the serial recording signals of four channels CH0 through CH3 to the recording system including the recording magnetic heads r0a through r3a and r0b through r3b, thereby recording the recording signals onto a recording magnetic tape. In this case, the recording signals are recorded onto the recording magnetic tape with the above-mentioned fundamental serial clock generated by the fundamental clock generator 34.

Figure 7:
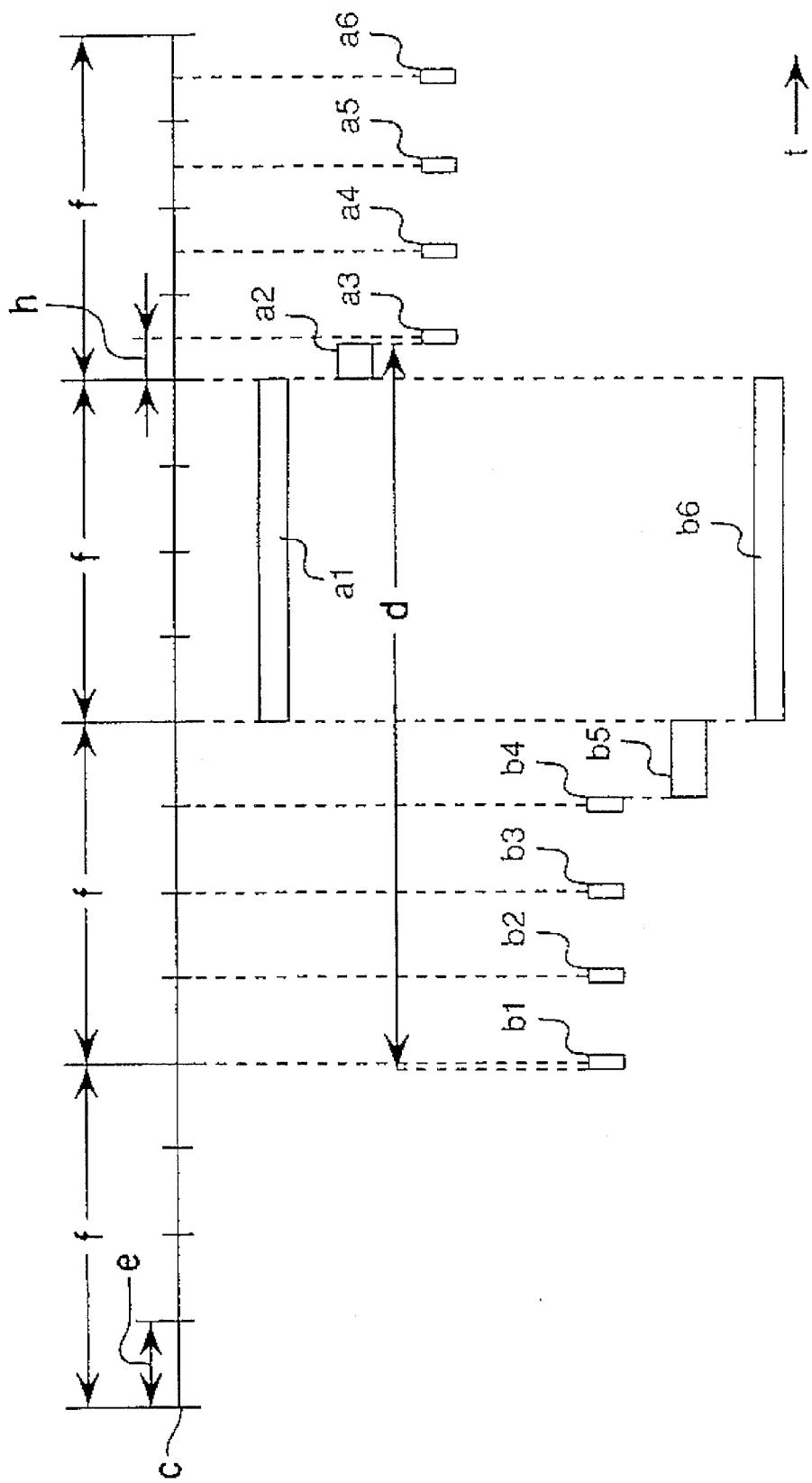
FIG. 7 is a timing chart of a signal processing for recording and reproducing a digital audio signal by the digital VTR of the preferred embodiment.
Figure 8:
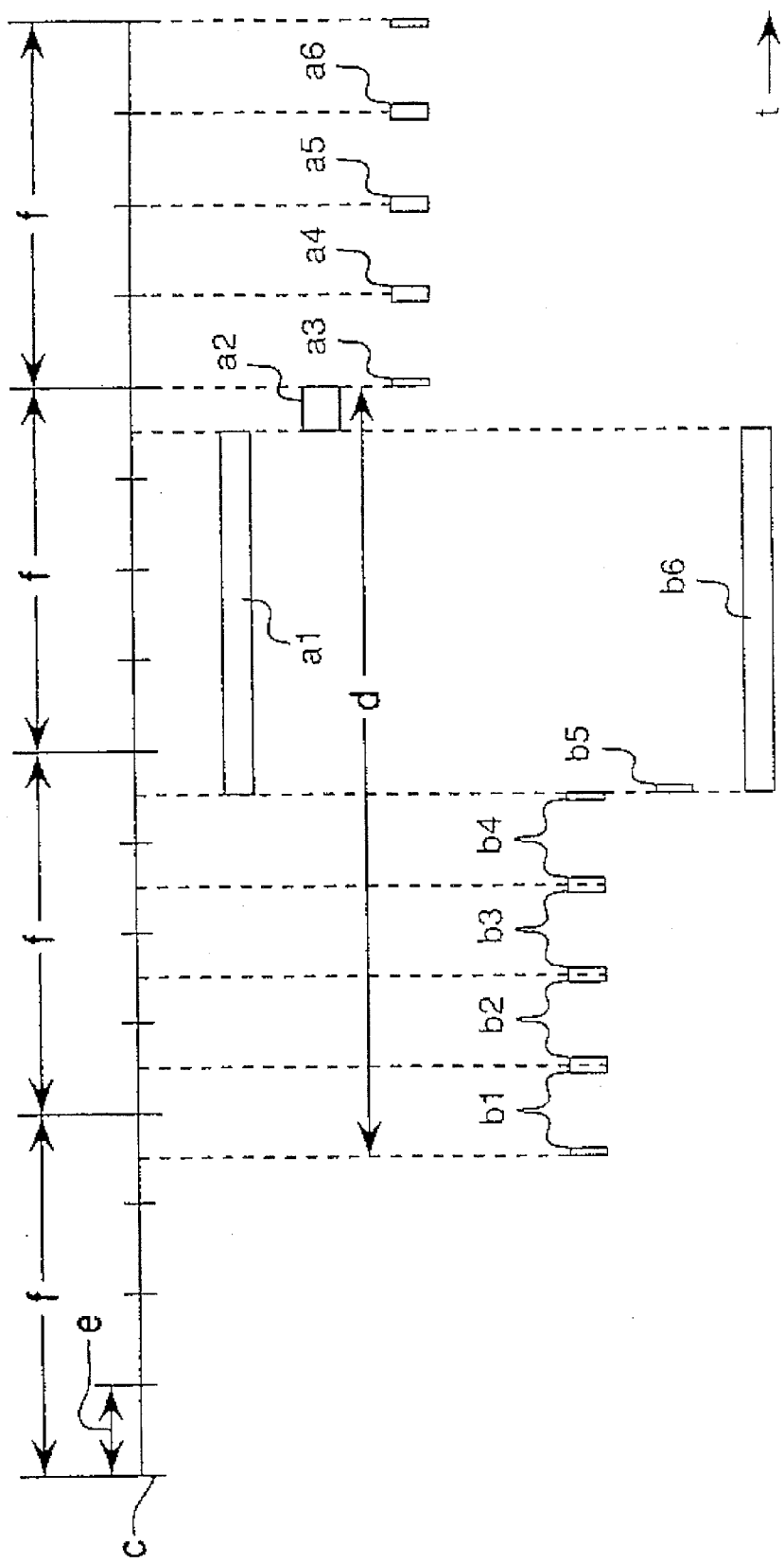
FIG. 8 is a timing chart of a signal processing for recording and reproducing a digital audio signal by a conventional D-1 type digital VTR.

FIG. 7 is a timing chart of a signal processing for recording and reproducing the digital audio signal in the 625-scanning-line mode in accordance with the present preferred embodiment of the present invention.

As shown in FIG. 7, an inputted audio or speech analog signal for a time interval of one field is converted into a digital audio signal in accordance with the interval of one field of the video signal C, and then the digital audio signal is temporarily stored in the field memory 5 for a time interval a1 of FIG. 7. Because of the arrangement of placing the recording area of the digital audio signal in the middle portion of each inclined track and setting the recording start position in the interval of one filed at the lower end X1 of the inclined track, a time interval margin to the start of recording is produced. Taking advantage of the time interval margin, there is executed the process for recording the digital audio signal such as the shuffling process, the error correction code generating process and the like for a time interval a2 of FIG. 7. Then, as shown in FIG. 1, the digital audio signal is divided into four sections or channels CH0 through CH3 respectively corresponding to a3 through a6 of FIG. 7, and then the digital audio signal of the four channels CH0 through CH3 are evenly and distributedly recorded in the four digital audio signal recording areas or sectors in the middle portion of each inclined track, as shown in FIG. 1.

In the reproducing stage, the data to be reproduced of the 4-channel digital audio signal in one field as shown in b1 through b4 of FIG. 7 are inputted to a field memory (not shown), digital audio signal reproducing processes including an error correction process, a deshuffling process is executed for a time interval b5, and the processed resulting digital audio signal is outputted at a time interval b6 of FIG. 7. In the above stage, because of the arrangement of placing the recording area of the digital audio signal in the middle portion, in order to take in or store in the field memory the reproduced data of the 4-channel digital audio signal for one field, the required time interval is reduced by 0.5 segment h as compared with such a case where the digital audio signal is recorded in the end portions of each inclined track.

Furthermore, as shown in FIG. 7, by virtue of the arrangement that each boundary between the adjacent fields f of the inputted audio signal is set so as to coincide with each boundary between the adjacent fields of the inputted digital video signal, a time interval margin corresponding to 0.5 segment h is produced when the reproduced digital audio signal is outputted in accordance with the same timing b6 of FIG. 7 as the input timing.

As a result, a cross-fade editing process as an editing process can be executed by the digital VTR of the present preferred embodiment of the present invention, which is provided with the reproducing magnetic heads put in advance of the recording magnetic heads by 8.5 segments d in a manner as shown in FIG. 7. This can reduce the load of a driving section for driving the AT magnetic heads.

As described above in the related art of the specification, in the D-1 type digital VTR, the time interval for reproducing the digital audio signal can not be established, and it is impossible to execute the above-mentioned cross-fade editing process. Further, in order to execute the double speed playback process, it is difficult to control the AT magnetic heads, and then it is necessary to increase the number of reproducing magnetic heads, as described above.

On the other hand, in the present preferred embodiment, since each boundary between the adjacent fields is always located at the end portions of each recording track, and then, two sets of reproducing AT magnetic heads p0a through p3a and p0b through p3b shown in FIG. 5 are used alternately in a unit of one segment. Therefore, for example, when a double speed playback is executed, the recording digital signal is reproduced from one field per two fields, namely, at intervals of two fields skipping one field. Furthermore, in moving a set of reproducing magnetic heads to the next field separated apart by one field, it is allowed to move a set of AT magnetic heads which is currently not used for reproduction, and then the control of the AT magnetic heads can be easily performed.

As described above, in recording data of the digital audio signals of the respective channels CH0 through CH3 evenly and distributedly into the four digital audio signal recording areas or sectors located in the middle portion of each inclined track, the address generator 10 is provided as shown in FIG. 10 in order to record the digital audio signal. The digital audio signal of each channel is recorded in the following order using the read address generator 10 of the memory controller 7 of the digital audio signal recording processing unit 1:

(a) in the order of the channels A1, A3, A2, and A4 in the segment S1;

(b) in the order of the channels A2, A4, A1, and A3 in the segment S2;
(c) in the order of the channels A3, A1, A4, and A2 in the segment S3; and
(d) in the order of the channels A4, A2, A3, and A1 in the segment S4, as is apparent from FIG. 1.

In other words, with the above-mentioned arrangement, the data of the digital audio signals of the channels A1, A2, A3 and A4 are evenly recorded so as to be distributed or dispersed, thereby allowing errors to be dispersed over whole the channels in opposition to the possible damage of the recording magnetic tape, and then allowing the damage thereof to be minimized.

As described above, the present invention adopts the arrangement of recording the digital audio signal in the middle portion of each inclined track and placing each boundary between the adjacent fields at the end portions of each inclined track. Therefore, when a cross-fade editing process is executed as an editing process by the digital VTR, the quantity of advance in position of the reproducing magnetic heads with respect to the recording magnetic head can be reduced. When a simultaneous reproducing position and an advance reproducing position are achieved by moving the AT magnetic heads, the quantity of movement of the AT magnetic heads can be reduced.

In the above-mentioned preferred embodiment, the digital audio signals of four channels are evenly and distributedly recorded into four audio areas or sectors located in the middle portion of each inclined track on the magnetic tape 100 as shown in FIG. 1, the present invention is not limited to this. The digital audio signals of a plurality of n channels may be evenly and distributedly recorded into a plurality of n audio areas or sectors located in the middle portion of each inclined track on the magnetic tape 100. In this case, errors are allowed to be dispersed over whole the channels in opposition to a possible damage of the tape, thereby allowing the damage thereof to be minimized.

In the above-mentioned preferred embodiment, the digital VTR which operates in the 625-scanning-line mode 109 is described. However, the present invention is not limited to this. The present invention can be applied to the digital VTR which operates in the 525-scanning-line mode 108. In this case, the same advantageous effects as those of the digital VTR of the 625 scanning line mode 109 can be obtained.

Although the present invention has been fully described by way of example with reference to the accompanying drawings, it is to be noted here that various changes and modifications will be apparent to those skilled in the art. Therefore, unless otherwise such changes and modifications depart from the scope of the present invention as defined by the appended claims, they should be construed as included therein.

What is claimed is:

1. An apparatus for recording inputted digital video and audio signals of one field, which are synchronous with each other, onto a plurality of inclined tracks of a magnetic tape using a plurality sets of helical scan type magnetic heads provided in a rotation head drum at predetermined angle intervals, comprising:

first storage means for temporarily and sequentially storing said inputted digital video signal therein;

second storage means for temporarily and sequentially storing said inputted digital audio signal therein;

read clock generating means for generating a read clock;

first read address generating means for generating a read address of said first storage means based on said read clock generated by said read clock generating means, so that said inputted digital video signal is read out and recorded through said magnetic heads onto both end portions of each of said inclined tracks of said magnetic tape, after starting recording said inputted digital video signal of one field onto an end of said inclined track, and ending recording said inputted digital video signal of one field onto another end of the other inclined track;

second read address generating means for generating a read address of said second storage means based on said read clock generated by said read clock generating means, so that said inputted digital audio signal is read out and recorded through said magnetic heads onto the middle portion of each of said inclined tracks of said magnetic tape; and recording means for combining said digital video signal and said digital audio signal respectively read out from said first and second storage means and for recording onto said magnetic tape.

2. The apparatus as claimed in claim 1, wherein said inputted digital audio signal are divided into a plurality of channels, and the middle portion of each of said inclined tracks where said inputted digital audio signal is to be recorded are divided into said plurality of channels, and wherein said second read address generating means generates said read address of said second storage means, so that said inputted digital audio signal is read out and recorded through said magnetic heads onto said channels of the middle portion of each of said inclined tracks of said magnetic tape, so as to be distributed in different orders of channels in respective inclined tracks.

3. The apparatus as claimed in claim 2, wherein said second storage means comprises a plurality of sections corresponding to said plurality of channels.

4. The apparatus as claimed in claim 2, wherein said read address of said second storage means includes a segment address, a channel address, and data-in-channel read address, and wherein said second address generating means comprises:

data-in-channel read address generating counter for generating said data-in-channel read address by counting said read address clock generated by said read clock generating means;

segment address generating counter for generating said segment address based on a carry signal outputted from said data-in-channel read address generating counter by counting said read clock generated by said read clock generating means; and channel address generating counter for generating said channel address based on a carry signal outputted from said channel address generating counter by counting said read clock generated by said read clock generating means.

5. A method for recording inputted digital video and audio signals of one field, which are synchronous with each other, onto a plurality of inclined tracks of a magnetic tape using a plurality sets of helical scan type magnetic heads provided in a rotation head drum at predetermined angle intervals, including the following steps of:

generating a read clock;

generating a read address of first storage means based on said read clock, so that said inputted digital video signal is read out and recorded through said magnetic heads onto both end portions of each of said inclined tracks of said magnetic tape, after starting recording said inputted digital video signal of one field onto an end of said inclined track, and ending recording said inputted digital video signal of one field onto another end of the other inclined track;

generating a read address of second storage means based on said read clock, so that said inputted digital audio signal is read out and recorded through said magnetic heads onto the middle portion of each of said inclined tracks of said magnetic tape; and combining said digital video signal and said digital audio signal respectively read out from said first and second storage means and recording onto said magnetic tape.

6. The method as claimed in claim 5, wherein said inputted digital audio signal are divided into a plurality of channels, and the middle portion of each of said inclined tracks where said inputted digital audio signal is to be recorded are divided into said plurality of channels, and wherein said read address of said second storage means is generated, so that said inputted digital audio signal is read out and recorded through said magnetic heads onto said channels of the middle portion of each of said inclined tracks of said magnetic tape, so as to be distributed in different orders of channels in respective inclined tracks.

* * * * *